US007619666B2

(12) United States Patent
Kotani

(10) Patent No.: US 7,619,666 B2
(45) Date of Patent: Nov. 17, 2009

(54) IMAGE PROCESSING APPARATUS, CONTROL METHOD THEREFOR, AND PROGRAM CORRECTING IMAGE DATA BASED ON FOREIGN SUBSTANCE INFORMATION AND INHIBITING SUCH CORRECTION

(75) Inventor: Takuya Kotani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 370 days.

(21) Appl. No.: 11/770,233

(22) Filed: Jun. 28, 2007

(65) Prior Publication Data

US 2008/0024629 A1 Jan. 31, 2008

(30) Foreign Application Priority Data

Jul. 26, 2006 (JP) ............... 2006-203739

(51) Int. Cl.
H04N 5/217 (2006.01)
(52) U.S. Cl. ..................................... 348/241
(58) Field of Classification Search ............... None
See application file for complete search history.

(56) References Cited

U.S. PATENT DOCUMENTS

| 6,940,550 | B2 | 9/2005 | Kitawaki et al. | ............ 348/246 |
| 7,295,233 | B2* | 11/2007 | Steinberg et al. | ............ 348/241 |
| 7,308,156 | B2* | 12/2007 | Steinberg et al. | ............ 382/294 |
| 7,340,109 | B2* | 3/2008 | Steinberg et al. | ............ 382/275 |
| 7,369,712 | B2* | 5/2008 | Steinberg et al. | ............ 382/274 |
| 7,424,170 | B2* | 9/2008 | Steinberg et al. | ............ 382/275 |
| 2002/0034144 | A1 | 3/2002 | Kotani | ............ 369/59.25 |
| 2004/0263887 | A1 | 12/2004 | Kotani | ............ 358/1.9 |
| 2006/0115177 | A1 | 6/2006 | Ishiga | |
| 2007/0035790 | A1 | 2/2007 | Kotani | ............ 358/537 |
| 2008/0025636 | A1 | 1/2008 | Kotani | ............ 382/276 |
| 2008/0025650 | A1 | 1/2008 | Kotani | ............ 382/309 |

FOREIGN PATENT DOCUMENTS

| JP | 2001-223894 | 8/2001 |
| JP | 2004-200864 | 7/2004 |
| JP | 2004-222231 | 8/2004 |

OTHER PUBLICATIONS

Chinese Office Action issued in counterpart Chinese Application No. 2007101363799 dated Mar. 27, 2009, and an English-language translation thereof.
Chinese Office Action issued in Chinese Application No. 200710136377X dated Oct. 17, 2008, in related Application No. 11/770,267, and an English-language translation thereof.

* cited by examiner

Primary Examiner—Justin P Misleh
(74) Attorney, Agent, or Firm—Fitzpatrick, Cella, Harper & Scinto

(57) ABSTRACT

An image processing apparatus which corrects input image data based on the image data and foreign substance information including information associated with a position and a size of a foreign substance adhering near an image sensor in an image capturing apparatus which has captured the image data includes a correction unit which corrects the image data based on the image data and the foreign substance information so as to reduce an influence of a shadow of the foreign substance reflected in the image data, a determination unit which determines whether an aperture value set when the image capturing apparatus has captured the image data satisfies a predetermined condition, and a control units which inhibits the correction unit from correcting the image data when the determination unit determines that the aperture value satisfies the predetermined condition.

5 Claims, 31 Drawing Sheets

FIG. 5

| ADDRESS OFFSET (Hex) | CODE (Hex) | MEANING |
|---|---|---|
| +00 | FF | Prefix |
| +01 | E0 | |
| +02 | | F-NUMBER (NUMERATOR) |
| +04 | | F-NUMBER (DENOMINATOR) |
| +06 | | LENS PUPIL POSITION (NUMERATOR) |
| +08 | | LENS PUPIL POSITION (DENOMINATOR) |
| +0A | | NUMBER OF FOREIGN SUBSTANCE REGIONS |
| +0C | | PARAMETER FOR FOREIGN SUBSTANCE REGION $D_1$<br>  RADIUS (TWO BYTES)<br>  X-COORDINATES OF CENTER (TWO BYTES)<br>  Y-COORDINATES OF CENTER (TWO BYTES) |
| | | PARAMETER FOR FOREIGN SUBSTANCE REGION $D_2$ |
| | | ... |
| | | PARAMETER FOR FOREIGN SUBSTANCE REGION $D_n$ |

FOREIGN SUBSTANCE REGION di

FIG. 13

| ADDRESS OFFSET (Hex) | CODE (Hex) | MEANING |
|---|---|---|
| +00 | | PROCESS ID |
| +02 | | APPLICATION RANGE<br><br>RADIUS (TWO BYTES)<br>X-COORDINATES OF CENTER (TWO BYTES)<br>Y-COORDINATES OF CENTER (TWO BYTES) |
| +08 | | RELATIVE POSITION FROM COPY SOURCE TO COPY DESIGNATION<br><br>X DIRECTION (TWO BYTES)<br>Y DIRECTION (TWO BYTES) |
| +06 | | POINTER TO DIFFERENTIAL IMAGE |

|   |   |   |
|---|---|---|
| 1 | 1 | 1 |
| 1 | 1 | 1 |
| 1 | 1 | 1 |

|   |   |   |   |   |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |
| 1 | 1 | 1 | 1 | 1 |

INITIAL STATE

EXECUTION OF
REPAIR PROCESS

REPAIR PROCESS

EXECUTION OF COPY
STAMP PROCESS

COPY STAMP
PROCESS

COPY SOURCE
REGION

COPY DESTINATION
REGION

CANCELLATION OF
REPAIR PROCESS

STATE BEFORE REPAIR
PROCESS IS COPIED

FIG. 29

| ADDRESS OFFSET (Hex) | CODE (Hex) | MEANING |
|---|---|---|
| +00 | FF | Prefix |
| +01 | E0 | |
| +02 | | F-NUMBER (NUMERATOR) |
| +04 | | F-NUMBER (DENOMINATOR) |
| +06 | | LENS PUPIL POSITION (NUMERATOR) |
| +08 | | LENS PUPIL POSITION (DENOMINATOR) |
| +0A | | NUMBER OF FOREIGN SUBSTANCE REGIONS |
| +0C | | PARAMETER FOR FOREIGN SUBSTANCE REGION $D_1$<br>  RADIUS (TWO BYTES)<br>  X-COORDINATES OF CENTER (TWO BYTES)<br>  Y-COORDINATES OF CENTER (TWO BYTES)<br>  CANCELLATION FLAG (ONE BYTES) |
| | | PARAMETER FOR FOREIGN SUBSTANCE REGION $D_2$ |
| | | ... |
| | | PARAMETER FOR FOREIGN SUBSTANCE REGION $D_n$ |

IMAGE PROCESSING APPARATUS, CONTROL METHOD THEREFOR, AND PROGRAM CORRECTING IMAGE DATA BASED ON FOREIGN SUBSTANCE INFORMATION AND INHIBITING SUCH CORRECTION

BACKGROUND OF THE INVENTION

1. Field of the Invention

The present invention relates to a technique of suppressing degradation of image quality due to foreign substances adhering to the surface of an optical low-pass filter or the like in an image capturing apparatus using an image sensor such as a CCD or a CMOS sensor.

2. Description of the Related Art

Recently, many kinds of image capturing apparatuses which generate image signals by using image sensors such as CCDs and record them as data, for example, digital cameras and digital video cameras, have come to be on the market. Digital cameras need not use any photosensitive films, which have been used as recording media, and record images as data on data recording media such as semiconductor memory cards and hard disk drives are used in place of such films. These data recording media allow write and erase operations many times, and hence can save expenses for consumables. That is, such media are very convenient.

In general, a digital camera is equipped with an LCD (Liquid Crystal Display) monitor device capable of displaying captured images as needed and a detachable large-capacity storage device.

Using a digital camera comprising these two devices makes it unnecessary to use any films as recording media which have been used as consumables and allows immediate checking of captured images by displaying them on the LCD monitor device. This makes it possible to erase unsatisfactory image data on the site or recapture the same image as needed. That is, this camera has remarkably improved the photo capturing efficiency as compared with a silver halide camera using films.

Such convenience and technical innovations such as an increase in the number of pixels of an image sensor have widened the application range of digital cameras. Recently, many lens-interchangeable digital cameras such as single-lens reflex cameras have been available.

Foreign substances such as dust and foreign particles (to be simply referred to as foreign substances hereinafter) sometimes adhere to the surfaces of the image sensor protective glass fixed to the image sensor and of an optical filter and the like (to be collectively referred to as image sensor optical system components hereinafter) arranged near the image sensor. When a foreign substance adheres to an image sensor optical system component in this manner, the foreign substance blocks light. In this case, for example, an object image corresponding to that portion cannot be obtained, resulting in degradation of the image quality of the captured image.

Not only a digital camera but also a camera using silver halide films suffers the problem that a foreign substance on a film is reflected in a frame. In a camera using films, however, since a film moves frame by frame, the same foreign substance is rarely reflected in all the frames.

In contrast to this, the image sensor of a digital camera does not move. That is, the camera performs image capturing by using the same image sensor. If, therefore, a foreign substance adheres to an image sensor optical system component, the same foreign substance is reflected in many frames (captured images). A lens-interchangeable digital camera, in particular, suffers a problem that a foreign substance tends to enter the camera when the user interchanges lenses.

The user therefore must always pay attention to the adhesion of a foreign substance to an image sensor optical system component, and spends much effort to check and clean foreign substances. Since an image sensor is placed relatively deep in the camera, in particular, it is not easy to check and clean foreign substances.

A foreign substance readily enters the lens-interchangeable digital camera during lens attaching/detaching operation. In addition, most of lens-interchangeable digital cameras have a focal-plane shutter in front of the image sensor, and a foreign substance easily adheres to an image sensor optical system component.

A foreign substance on such an image sensor usually adheres to the protective glass or the optical filter instead of the surface of the image sensor, and hence the image forming state of the foreign substance varies depending on the aperture value or pupil position of the photographing lens. That is, as the aperture value becomes closer to the full open aperture value, a foreign substance blurs. Even if a small foreign substance adheres to such a component, there is almost no influence on the captured image. In contrast, as the aperture value increases, the foreign substance is clearly focused to influence the captured image.

There is known a method of making a foreign substance less noticeable by using a combination of a normally captured image and an image of only a foreign substance on the image sensor which is obtained by capturing a white wall or the like while the lens is stopped down (see Japanese Patent Laid-Open No. 2004-222231). This method is, however, cumbersome to the user because he/she must always be conscious of the correspondence between an image captured for the detection of a foreign substance and normally captured images to be associated with it.

It is known that as the f-number in normal image capturing decreases (i.e., the aperture value of the lens becomes closer to the full open aperture value), a foreign substance image blurs and becomes less noticeable. Performing analysis processing or interpolation processing while a foreign substance image blurs and becomes less noticeable tends to cause errors. This may lead to deterioration of image quality.

SUMMARY OF THE INVENTION

The present invention has been made in consideration of the above problems, and has as its object to properly correct a captured image and suppresses the influence of a foreign substance on the captured image even when the foreign substance adheres to an image sensor or the protective glass fixed to the image sensor, the optical filter placed near the image sensor, or the like.

In order to solve the above problems and achieve the above object, according to a first aspect of the present invention, there is provided an image processing apparatus which corrects input image data based on the image data and foreign substance information including information associated with a position and a size of a foreign substance adhering near an image sensor in an image capturing apparatus which has captured the image data, comprising a correction unit adapted to correct the image data based on the image data and the foreign substance information so as to reduce an influence of a shadow of the foreign substance reflected in the image data, a determination unit adapted to determine whether an aperture value set when the image capturing apparatus has captured the image data satisfies a predetermined condition, and a control unit adapted to inhibit the correction unit from correcting the image data when the determination unit determines that the aperture value satisfies the predetermined condition.

According to a second aspect of the present invention, there is provided a method of controlling an image processing apparatus which corrects input image data based on the image data and foreign substance information including information associated with a position and a size of a foreign substance adhering near an image sensor in an image capturing apparatus which has captured the image data, comprising the steps of correcting the image data based on the image data and the foreign substance information so as to reduce an influence of a shadow of the foreign substance reflected in the image data, determining whether an aperture value set when the image capturing apparatus has captured the image data satisfies a predetermined condition, and inhibiting correction of the image data in the correcting step when it is determined in the determining step that the aperture value satisfies the predetermined condition.

According to a third aspect of the present invention, there is provided a program for controlling an image processing apparatus which corrects input image data based on the image data and foreign substance information including information associated with a position and a size of a foreign substance adhering near an image sensor in an image capturing apparatus which has captured the image data, causing a computer to execute the steps of correcting the image data based on the image data and the foreign substance information so as to reduce an influence of a shadow of the foreign substance reflected in the image data, determining whether an aperture value set when the image capturing apparatus has captured the image data satisfies a predetermined condition, and inhibiting correction of the image data in the correcting step when it is determined in the determining step that that the aperture value satisfies the predetermined condition.

Further features of the present invention will become apparent from the following description of exemplary embodiments with reference to the attached drawings.

BRIEF DESCRIPTION OF THE DRAWINGS

FIG. 5 is a view showing an example of the data format of foreign substance correction data;

FIG. 13 is a view showing the data structure of an editing log in the image editing program;

FIGS. 20A and 20B are views each showing an example of a smoothing filter;

FIG. 29 is a view showing an example of the data format of foreign substance correction data to which a cancellation flag is added;

DESCRIPTION OF THE EMBODIMENTS

The preferred embodiments of the present invention will be described in detail below with reference to the accompanying drawings.

First Embodiment

This embodiment will exemplify a case wherein a camera body detects a foreign substance to attach foreign substance correction data to image data, and an image processing apparatus outside the camera removes the foreign substance from the image data by using the foreign substance correction data attached to the image data.

Figure 1:
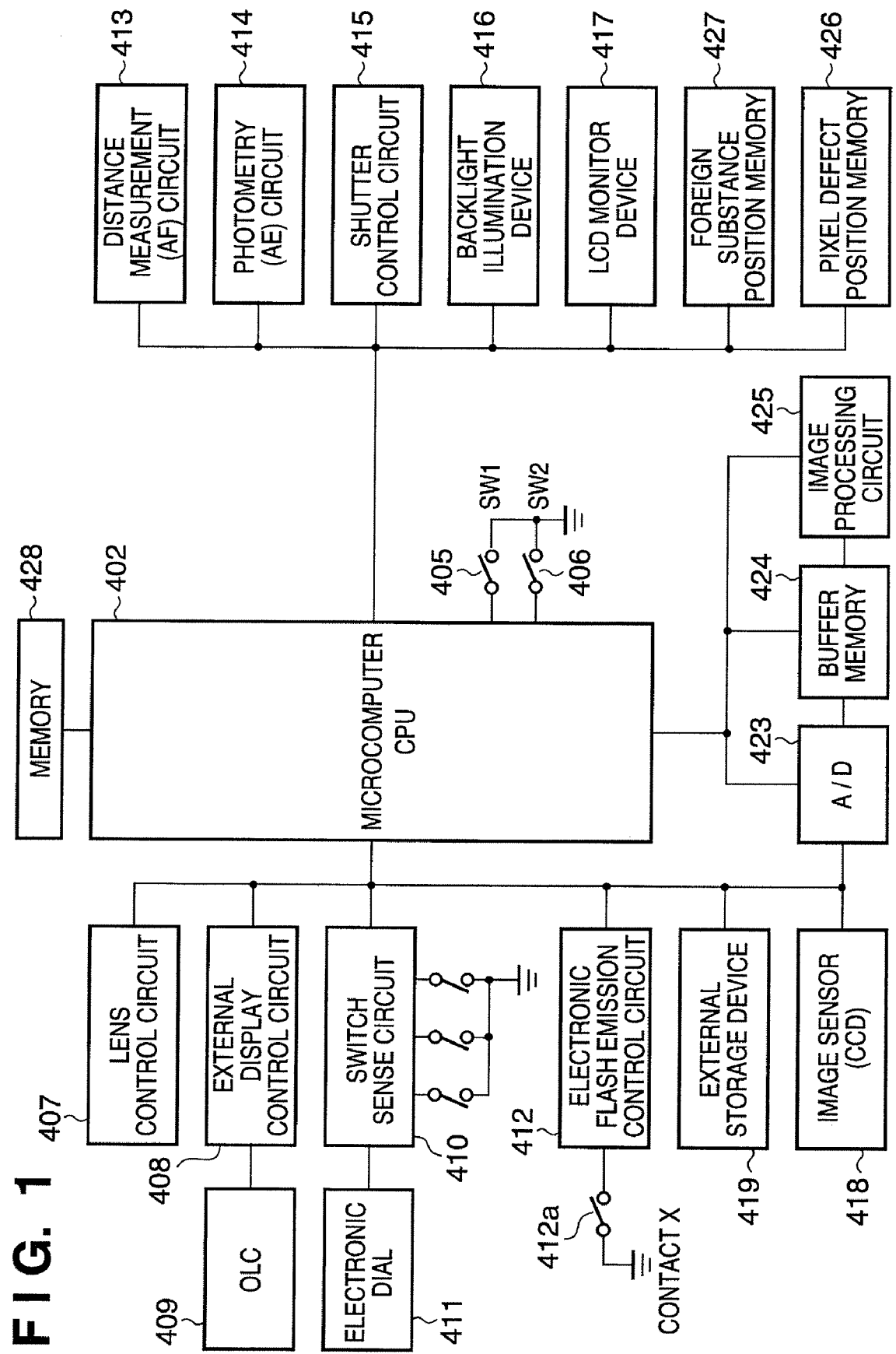
FIG. 1 is a block diagram showing the circuit arrangement of a lens-interchangeable single-lens reflex digital camera as an image capturing apparatus according to the first embodiment of the present invention.

FIG. 1 is a block diagram showing the circuit arrangement of a lens-interchangeable single-lens reflex digital camera as an image capturing apparatus according to the first embodiment of the present invention.

Referring to FIG. 1, a microcomputer 402 controls the overall operation of the camera, for example, processing for image data output from an image sensor (a CCD in this embodiment) 418 and display control on an LCD monitor device 417.

Figure 2:
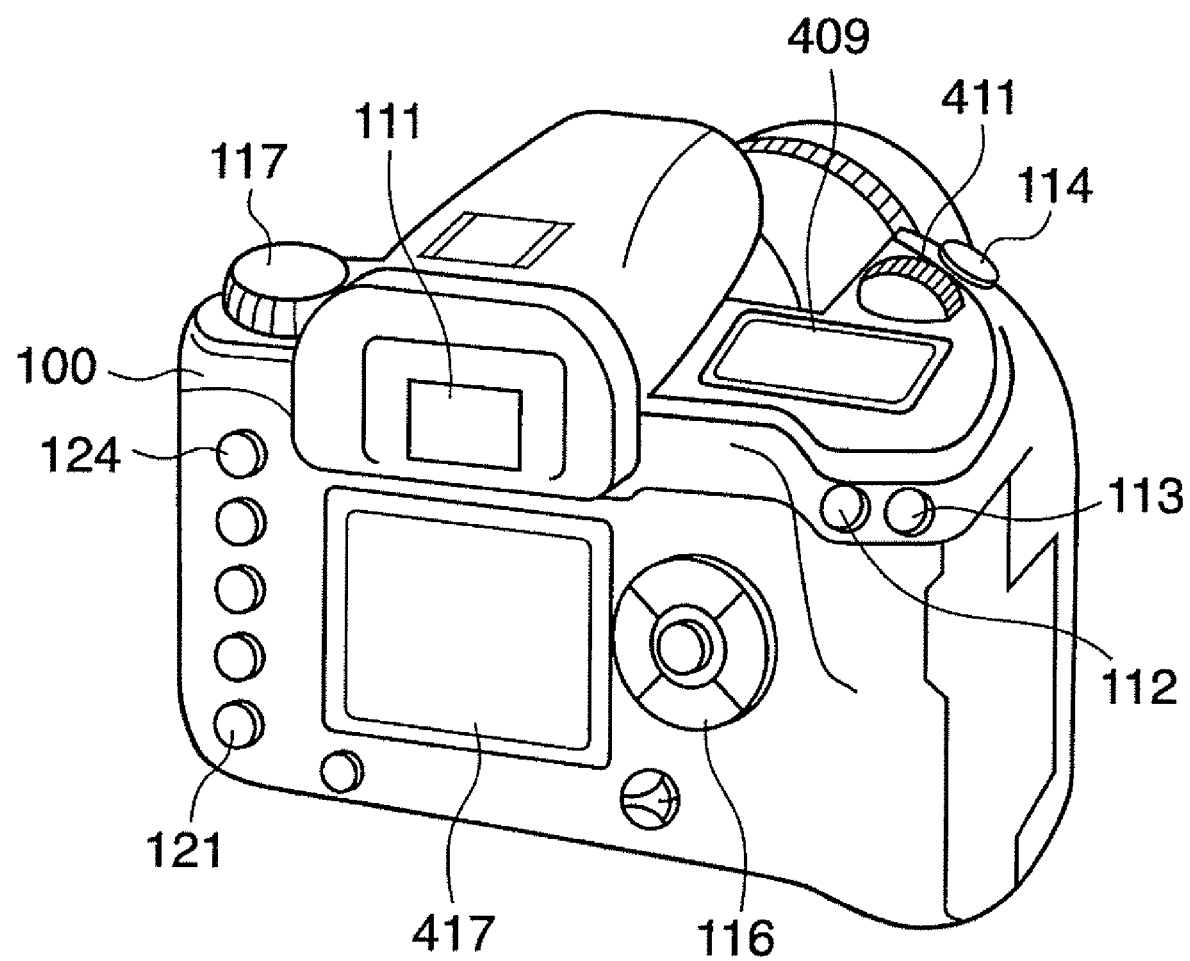
FIG. 2 is a perspective view showing the outer appearance of a digital camera according to the first embodiment.

A switch (SW1) 405 is turned on when the user half-presses a release button 114 (see FIG. 2). When the switch (SW1) 405 is turned on, the digital camera of this embodiment is set to be ready for image capturing. A switch (SW2) 406 is turned on when the release button 114 is pressed to the second stroke position (a full-pressed state). When the switch (SW2) 406 is turned on, the digital camera of this embodiment starts image capturing.

A lens control circuit 407 communicates with a photographing lens 200 (see FIG. 3) and performs driving control on the photographing lens 200 and aperture vanes.

Referring to FIG. 1, an external display control circuit 408 controls an external display device (OLC) 409 and a display device (not shown) in the viewfinder. A switch sense circuit 410 transfers signals from many switches and the like including an electronic dial 411 provided for the camera to the microcomputer 402.

An electronic flash emission control circuit 412 is grounded through an X contact 412a and controls an external electronic flash unit. A distance measurement circuit 413 detects a defocus amount for AF with respect to an object. A photometry circuit 414 measures the brightness of an object.

A shutter control circuit 415 controls the shutter to properly expose the image sensor. An LCD monitor device 417 and a backlight illumination device 416 comprises an image display device. An external storage device 419 is, for example, a hard disk drive, semiconductor memory card, or the like which is detachably mounted in the camera body.

The following components connect to the microcomputer 402: an A/D converter 423, an image buffer memory 424, an image processing circuit 425 comprising a DSP and the like, and a pixel defect position memory 426 storing information indicating that a predetermined pixel in the image sensor is itself a defect. A foreign substance position memory 427 storing a pixel position in the image sensor at which an image failure has occurred due to a foreign substance also connects to the microcomputer 402. Note that this apparatus preferably uses nonvolatile memories as the pixel defect position memory 426 and the foreign substance position memory 427. The pixel defect position memory 426 and the foreign substance position memory 427 may store information using different addresses within the same memory space.

Reference numeral 428 denotes a nonvolatile memory storing programs and the like which the microcomputer 402 executes.

Figure 3:
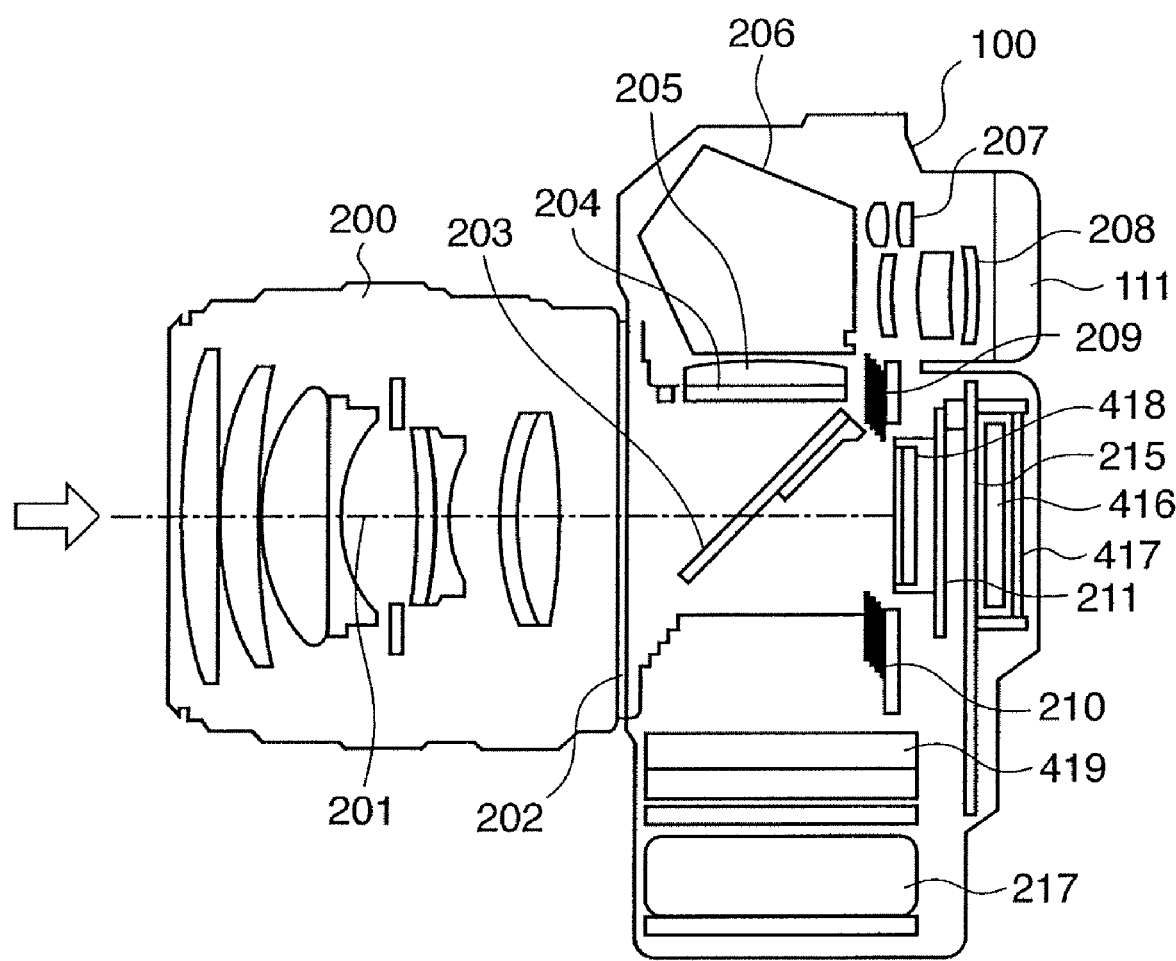
FIG. 3 is a vertical sectional view showing the internal structure of the digital camera according to the first embodiment.

FIG. 2 is a perspective view showing the outer appearance of the digital camera according to this embodiment. FIG. 3 is a vertical sectional view of FIG. 2.

Referring to FIG. 2, an eyepiece window 111 for the observation of the viewfinder, an AE (Automatic Exposure) lock button 112, a distance measurement point selection button 113 for AF, and the release button 114 for image capturing are provided on the upper portion of a camera body 100. The electronic dial 411, a capturing mode selection dial 117, and the external display device 409 are also provided on the upper portion. The electronic dial 411 is a multi-function signal input device which the user operates to input numerical values to the camera, together with other operation buttons, or to switch image capturing modes. The external display device 409 comprises a liquid crystal display device, and displays capturing conditions such as a shutter speed, an aperture value, and an image capturing mode, and other pieces of information.

The LCD monitor device 417 which displays captured images, various setting windows, and the like, a monitor switch 121 for turning on/off the LCD monitor device 417, a 4-way selector switch 116, and a menu button 124 are provided on the rear surface of the camera body 100.

The 4-way selector switch 116 has four buttons arranged vertically and horizontally and a SET button placed in the center. The user uses this switch to issue, to the camera, an instruction to select or execute a menu item displayed on the LCD monitor device 417 or the like.

The menu button 124 is a button for causing the LCD monitor device 417 to display a menu window for performing various kinds of settings in the camera. When, for example, selecting and setting an image capturing mode, the user presses the menu button 124, then selects a desired mode by operating the up, down, left, and right buttons of the 4-way selector switch 116, and finally sets the SET button while the desired mode is selected, thereby completing the setting.

Since the LCD monitor device 417 of this embodiment is of a transmission type, the user cannot visually check any image only by driving the LCD monitor device. That is, it is always necessary to provide the backlight illumination device 416 on the rear surface of this monitor device, as shown in FIG. 3. As described above, the LCD monitor device 417 and the backlight illumination device 416 comprise an image display device.

As shown in FIG. 3, the photographing lens 200 as an image capturing optical system is detachably mounted on the camera body 100 through a lens mount 202. Referring to FIG. 3, reference numeral 201 denotes a capturing optical axis; and 203, a quick return mirror.

The quick return mirror 203 is placed in the capturing optical path, and can move between a position at which the mirror guides object light from the photographing lens 200 to the viewfinder optical system (the position shown in FIG. 3, which will be referred to as an oblique mount position) and a position at which the mirror retreats outside the capturing optical path (which will be referred to as a retreat position).

Referring to FIG. 3, object light guided from the quick return mirror 203 to the viewfinder optical system is formed into an image on a focusing screen 204. Reference numeral 205 denotes a condenser lens for improving the visibility of the viewfinder; and 206, a pentagonal roof prism, which guides object light passing through the focusing screen 204 and the condenser lens 205 to an eyepiece 208 for the observation of the viewfinder and a photometry sensor 207.

Reference numerals 209 and 210 denote rear and front curtains constituting a shutter. Opening the rear and front curtains 209 and 210 will expose the image sensor 418 as a solid-state image sensor placed behind them for a necessary period of time. The A/D converter 423, the image processing circuit 425, and the like process a captured image converted into an electrical signal for each pixel by the image sensor. The external storage device 419 stores the resultant data as image data.

The image sensor 418 is held on a printed board 211. A display board 215 as another printed board is placed behind the printed board 211. The LCD monitor device 417 and the backlight illumination device 416 are arranged on the opposite side surface of the display board 215.

Reference numeral 419 denotes an external storage device storing image data; and 217, a battery (portable power supply). The external storage device 419 and the battery 217 are detachable from the camera body.

(Foreign Substance Detection Processing)

Figure 4:
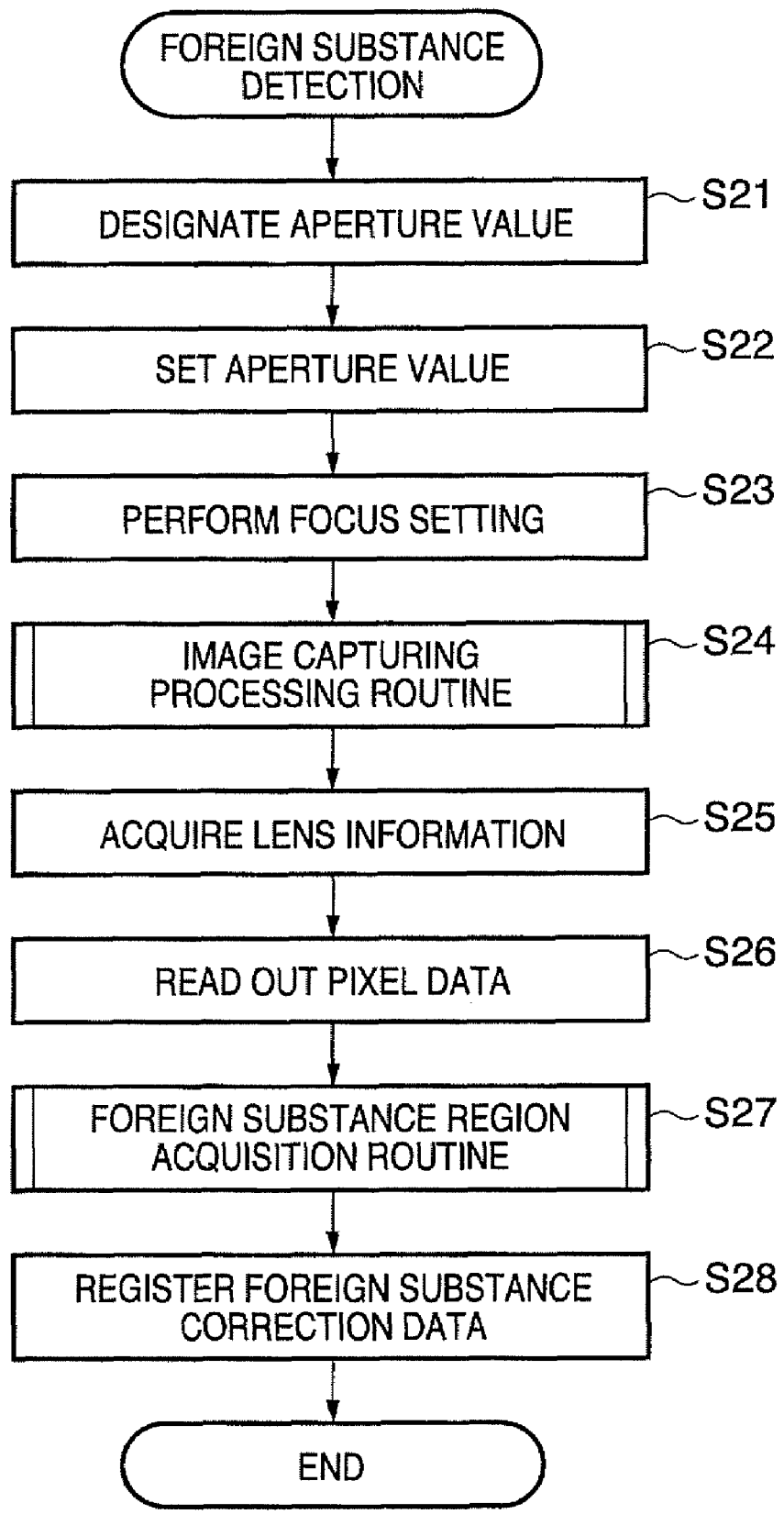
FIG. 4 is a flowchart for explaining foreign substance detection processing in the digital camera according to the first embodiment.

FIG. 4 is a flowchart for explaining foreign substance detection processing (detection processing for a pixel position at which an image defect is caused by a foreign substance) in the digital camera according to this embodiment. The microcomputer 402 executes this processing by executing the foreign substance detection processing program stored in the memory 428.

Foreign substance detection processing is performed by capturing a foreign substance detection image. When foreign substance detection processing is to be performed, the camera is placed to direct the capturing optical axis 201 of the photographing lens 200 to a surface having a uniform color such as the exit surface of a surface light source unit or a white wall, and preparation is made to capture an image for foreign substance detection. Alternatively, the user mounts a light unit (a compact light source device to be mounted in place of a lens) for foreign substance detection on the lens mount 202 and makes preparation to capture an image for foreign substance detection. As a light source for a light unit, for example, a white LED may be used, and it is preferable to adjust the size of an emission surface to set a predetermined aperture value (for example, F64 in this embodiment).

Although this embodiment will exemplify a case wherein a normal photographing lens is used, it suffices to detect a foreign substance by mounting the above light unit on the lens mount 202. As described above, an image for foreign substance detection in this embodiment is an image having a uniform color.

When the user issues an instruction to start foreign substance detection processing by operating, for example, the 4-way selector switch 116 upon completion of the preparation, the microcomputer 402 performs aperture setting first. The image forming state of a foreign substance near the image sensor changes depending on the aperture value of the lens, and the position of the foreign substance changes depending on the pupil position of the lens. It is therefore necessary to hold an aperture value and the pupil position of the lens at the time of capturing of an image for foreign substance detection in foreign substance correction data in addition to the position and size of the foreign substance.

If, however, it is determined in advance in the step of generating foreign substance correction data that the same aperture value is always used even when a different lens is used, it is not always necessary to hold the aperture value in foreign substance correction data. With regard to a pupil position as well, using a light unit or permitting the use of only a specific lens will eliminate the necessity to hold a pupil position in foreign substance correction data. That is, when the use of a plurality of lenses is to be permitted or an aperture value to be stopped down is to be changed as needed in the step of generating foreign substance correction data, it is necessary to hold an aperture value and the pupil position of the lens at the time of detection in foreign substance correction data. Note that the pupil position in this case is the distance from the image capturing plane (focal plane) of the exit pupil.

In this case, for example, F16 is designated (step S21).

The microcomputer 402 then causes the lens control circuit 407 to perform aperture vane control on the photographing lens 200 to set the stop to the aperture value designated in step S21 (step S22). The microcomputer 402 also sets the focus position to the infinity (step S23).

Upon setting the aperture value and focus position of the photographing lens, the microcomputer 402 executes image capturing in the foreign substance detection mode (step S24). The capturing processing routine to be performed in step S24 will be described in detail later with reference to FIG. 9. The image buffer memory 424 stores captured image data.

When image capturing is complete, the microcomputer 402 acquires the aperture value and lens pupil position at the time of image capturing (step S25). The microcomputer 402 reads out data corresponding to each pixel of a captured image stored in the image buffer memory 424 into the image processing circuit 425 (step S26). The image processing circuit 425 performs the processing shown in FIG. 6 and acquires the position and size of a pixel in which a foreign substance exists (step S27). The microcomputer 402 registers, in the foreign substance position memory 427, the position and size of the pixel in which the foreign substance exists, which are acquired in step S27, and the aperture value and lens pupil position information acquired in step S25 (step S28). In this case, when the above light unit is used, the microcomputer 402 cannot acquire lens information. If, therefore, the microcomputer 402 cannot acquire any lens information, the microcomputer 402 determines that the light unit is used, and registers predetermined lens pupil position information and the converted aperture value calculated from the diameter of the light source for the light unit.

In step S28, the microcomputer 402 checks the presence/absence of a pixel defect by comparing the position of a fault pixel (pixel defect) at the time of the manufacture which is recorded in advance on the pixel defect position memory 426 with the position of the readout pixel data. The position of only a foreign substance region for which it is determined that a pixel defect is irrelevant is allowed to be registered in the foreign substance position memory 427.

FIG. 5 shows an example of the data format of foreign substance correction data stored in the foreign substance position memory 427. As shown in FIG. 5, foreign substance correction data to be stored includes lens information and the position information and size information of a foreign substance at the time of capturing of a detection image. This foreign substance correction data is added to the image data together with the capturing information of the image data at the time of normal image capturing, and the resultant data is used for foreign substance removing processing to be described later.

More specifically, the microcomputer 402 stores the actual aperture value (f-number) at the time of capturing of a detection image and a lens pupil position at that time as lens information at the time of capturing of a detection image. Subsequently, the microcomputer 402 repeatedly stores parameters for each concrete foreign substance region by the number of times corresponding to the number of foreign substance regions. Parameters for each foreign substance region are a set of three numerical values including the radius (e.g., two bytes) of a foreign substance, the x-coordinate (e.g., two bytes) of the center of an effective image region, and the y-coordinate (e.g., two bytes) of the center.

If the size or the like of the foreign substance position memory 427 imposes a restriction on the size of foreign substance correction data, the microcomputer 402 preferentially stores data starting from the head of the foreign substance region obtained in step S27. This is because in the foreign substance region acquisition routine in step S27, foreign substance regions are sorted in the order of lesser noticeable foreign substances.

(Foreign Substance Region Acquisition Routine)

The foreign substance region acquisition routine to be performed in step S27 will be described in detail next with reference to FIGS. 6 to 8.

Figure 7:
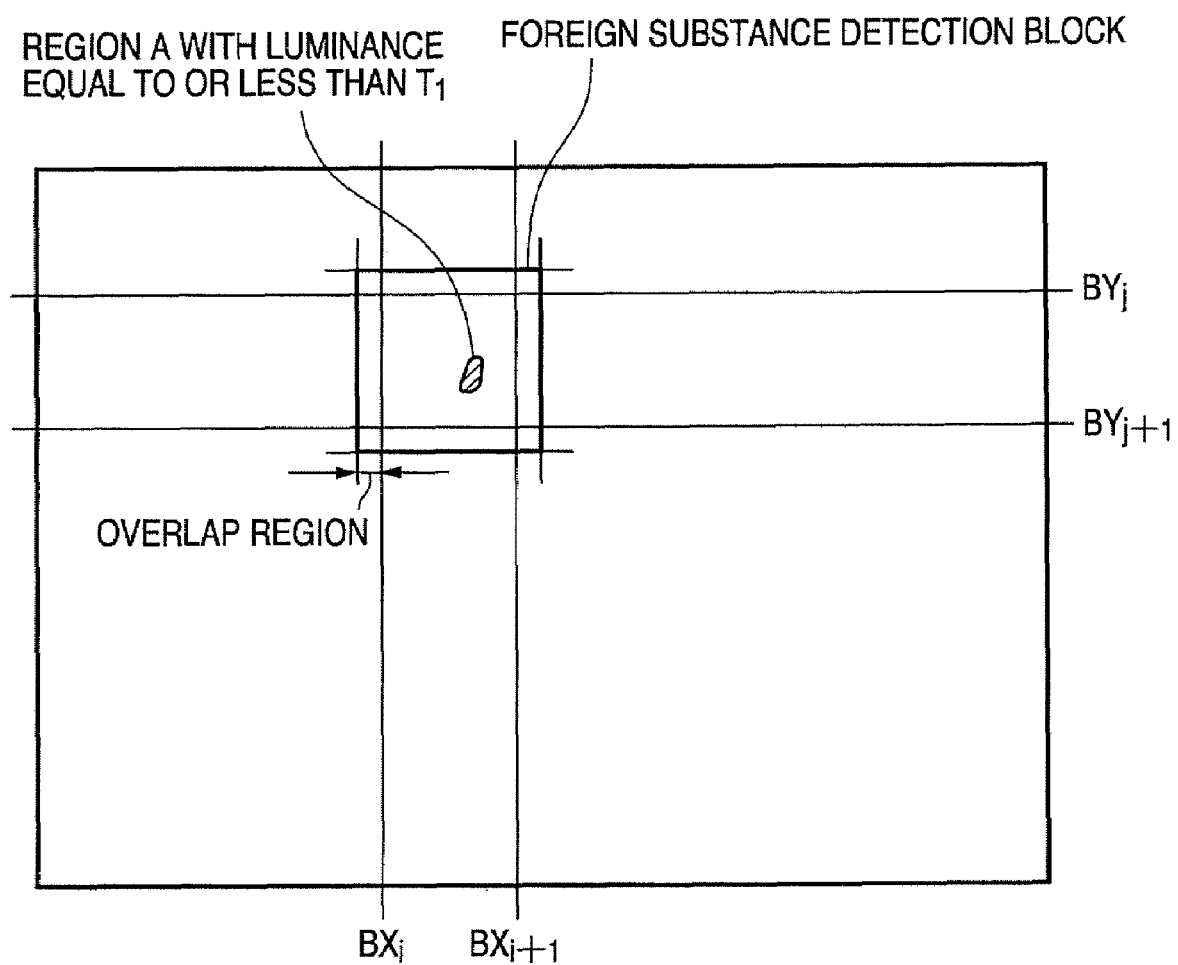
FIG. 7 is a view showing the unit of processing in the foreign substance region determination processing performed in step S62 in FIG. 6.

As shown in FIG. 7, the microcomputer 402 rasterizes the readout image data in the memory, and processes the data on a block basis. The microcomputer 402 performs this processing to cope with vignetting due to lens or sensor characteristics. Vignetting is a phenomenon in which the peripheral portion of a lens becomes lower in luminance than the central portion. It is known that reducing the aperture value of the lens will suppress this phenomenon to some extent. Even in a state wherein the lens is stopped down, determining a foreign substance position with respect to a captured image by using a predetermined threshold makes it impossible to accurately detect a foreign substance on a peripheral portion depending on the lens to be used. For this reason, the influence of vignetting is reduced by dividing an image into blocks.

If, however, an image is simply divided into blocks, and different thresholds are set for adjacent blocks, detection results across the blocks differ from each other. For this reason, adjacent blocks are made to overlap, and a pixel determined as a foreign substance in either of the blocks constituting the overlap region is handled as a foreign substance region.

Figure 6:
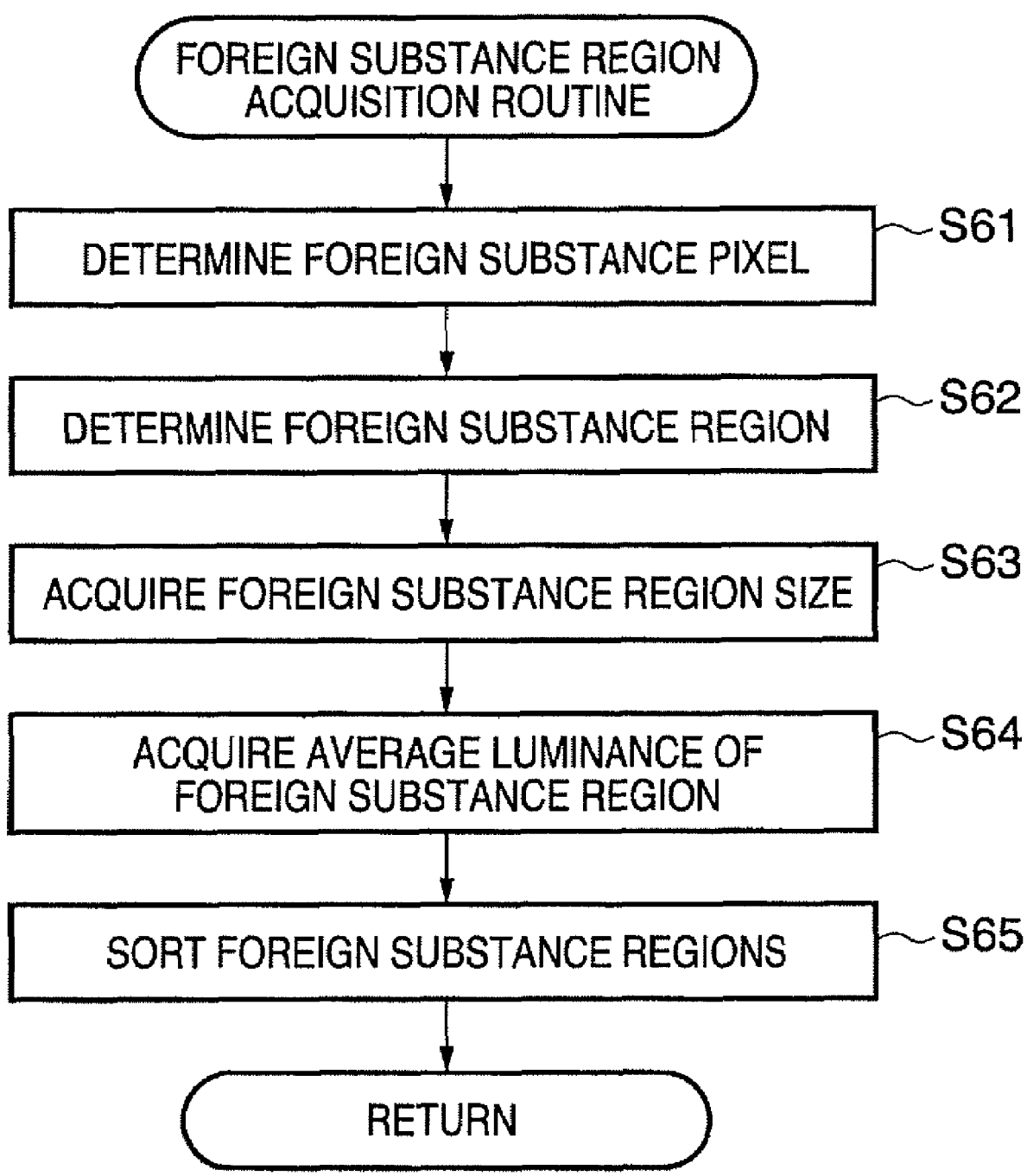
FIG. 6 is a flowchart for explaining the details of the foreign substance region acquisition routine performed in step S27 in FIG. 4.

The microcomputer 402 performs foreign substance region determination within each block in accordance with the processing procedure shown in FIG. 6. First of all, the microcomputer 402 calculates a maximum luminance Lmax and an average luminance Lave within a block and calculates a threshold T1 within the block by using the following equation:

$$T1 = Lave \times 0.6 + Lmax \times 0.4$$

The microcomputer 402 regards a pixel which does not exceed the threshold as a foreign substance pixel (step S61), and regards an isolated region comprising the foreign substance pixel as a foreign substance region di (i=0, 1, . . . n) (step S62). As shown in FIG. 8, the microcomputer 402 obtains, for each foreign substance region, maximum and minimum values Xmax and Xmin of the coordinates of the pixel forming the foreign substance region in the horizontal direction and maximum and minimum values Ymax and Ymin of the coordinates in the vertical direction, thereby calculating a radius ri representing the size of the foreign substance region di according to the following equation (step S63):

$$ri = \sqrt{[\{(Xmax - Xmin)/2\}^2 + \{(Ymax - Ymin)/2\}^2]}$$

Figure 8:
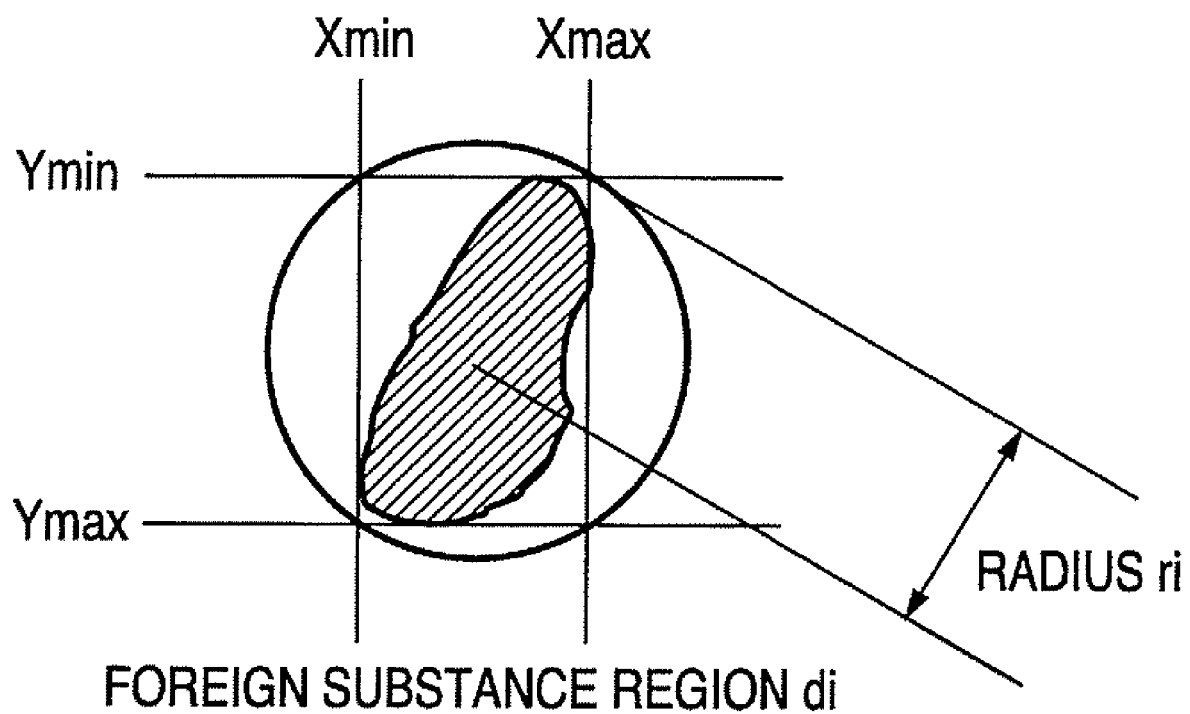
FIG. 8 is a view showing an outline of foreign substance region size calculation performed in step S63 in FIG. 6.

FIG. 8 shows the relationship between Xmax, Xmin, Ymax, Ymin, and ri.

Subsequently, in step S64, the microcomputer 402 calculates an average luminance value for each foreign substance region.

In some case, some restriction is imposed on the data size of foreign substance correction data due to a restriction on the size of the foreign substance position memory 427. In order to cope with such a case, pieces of foreign substance position information are sorted according to magnitudes and the average luminance values of foreign substance regions (step S65). In this embodiment, the microcomputer 402 performs sorting in descending order of ri. If the pieces of information are equal in ri, the microcomputer 402 performs sorting in descending order of average luminance values. This makes it possible to preferentially register noticeable foreign substances in foreign substance correction data. Let Di be a foreign substance region which has undergone sorting, and Ri be the radius of the foreign substance region Di.

If there is a foreign substance region larger than a predetermined size, it suffices to exclude it from sorting targets and place it at the end of a sorted foreign substance region list. This is because subsequent interpolation processing for a large foreign substance region sometimes leads to degradation, of image quality, and hence it is preferable to handle such a region as the lowest in the order of preference of editing targets.

(Capturing Processing Routine)

Figure 9:
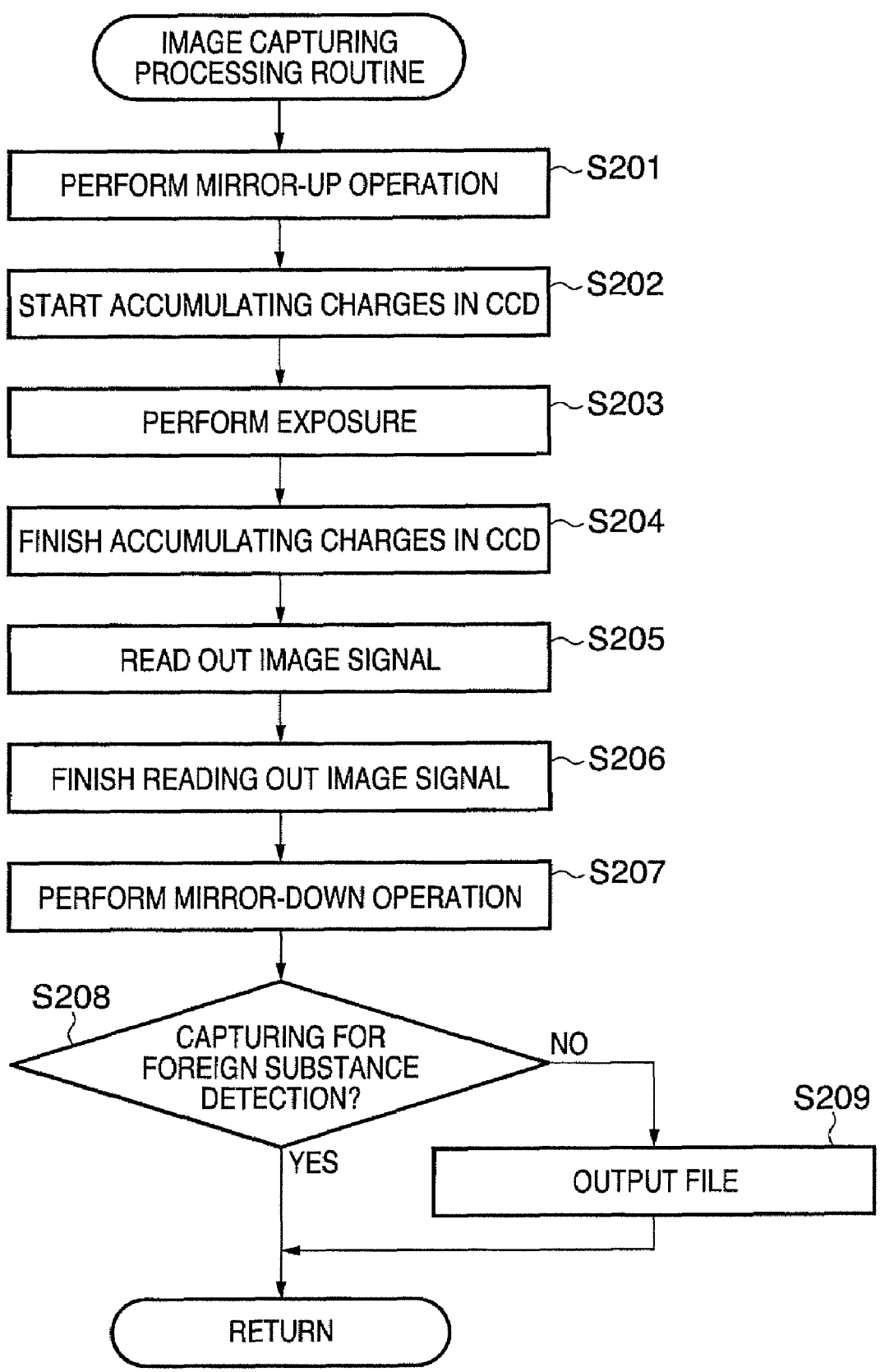
FIG. 9 is a flowchart for explaining the details of the image capturing processing routine performed in step S24 in FIG. 4.

The capturing processing routine performed in step S24 in FIG. 4 will be described next in detail with reference to the flowchart of FIG. 9. The microcomputer 402 executes this processing by executing the capturing processing program stored in the memory 428.

When executing this capturing processing routine, the microcomputer 402 moves the quick return mirror 203 shown in FIG. 3 in step S201 to perform so-called mirror-up operation so as to make the quick return mirror 203 retreat outside the capturing optical path.

In step S202, the microcomputer 402 starts accumulating electric charges by using the image sensor. In step S203, the microcomputer 402 performs exposure by making the front and rear curtains 210 and 209 of the shutter shown in FIG. 3 travel. In step S204, the focusing screen 204 completes the electric charge accumulation by the image sensor. In step S205, the microcomputer 402 reads out an image signal from the image sensor and temporarily stores the image data processed by the A/D converter 423 and the image processing circuit 425 in the image buffer memory 424.

Upon completing the readout of all image signals from the image sensor in step S206, the microcomputer 402 performs mirror-down operation of the quick return mirror 203 to return the quick return mirror to the oblique position, and terminates the series of capturing operations in step S207.

In step S208, the microcomputer 402 determines whether to perform normal image capturing or foreign substance detection image capturing. When the microcomputer 402 determines to perform normal image capturing, the process advances to step S209 to record camera setting values and the like at the time of image capturing and the foreign substance correction data shown in FIG. 5 on the external storage device 419 in association with image data.

More specifically, the microcomputer 402 can associate the above data by, for example, adding foreign substance correction data to an Exif area which is the header area of an image file on which camera setting values and the like at the time of image capturing are recorded. Alternatively, the microcomputer 402 can associate the data by independently recording foreign substance correction data as a file and recording only link information to the foreign substance correction data file on the image data. If, however, the microcomputer 402 separately records the image file and the foreign substance correction data file, the link relationship may be lost upon movement of the image file. It is therefore preferable to integrally hold the foreign substance correction data and the image data.

(Foreign Substance Removing Processing)

A foreign substance removing processing procedure will be described next. Foreign substance removing processing is performed on a separately prepared image processing apparatus instead of the digital camera body.

Figure 10:
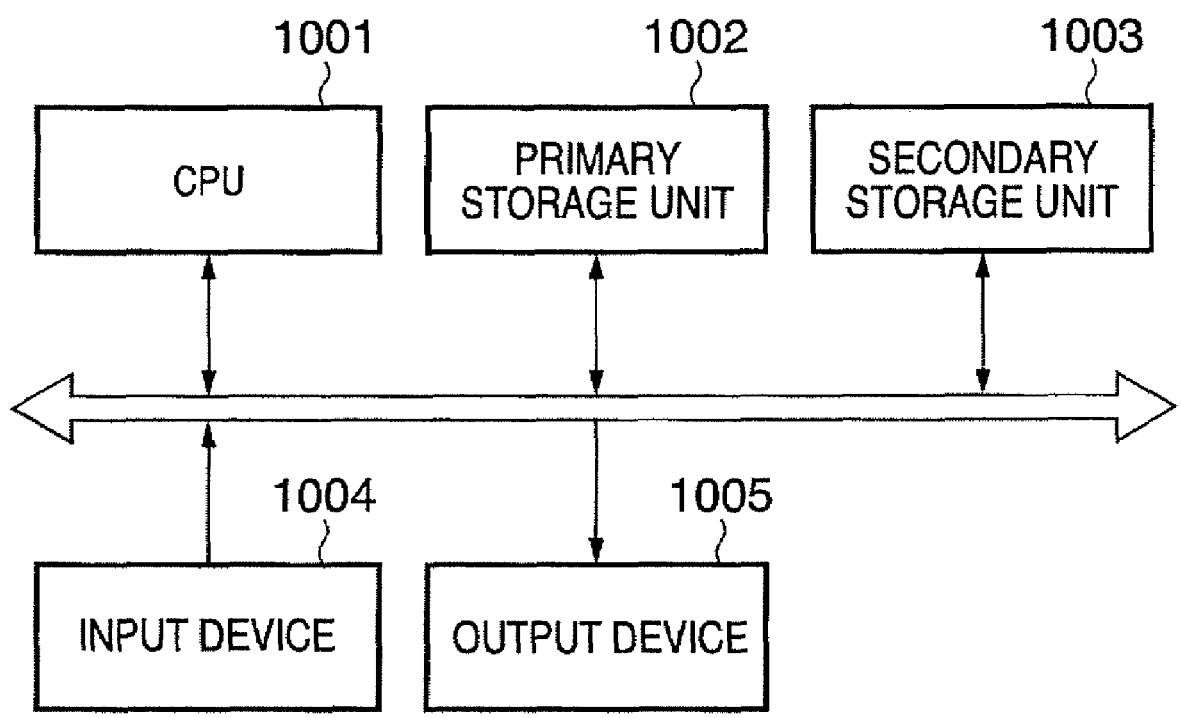
FIG. 10 is a view schematically showing the system configuration of an image processing apparatus.

FIG. 10 is a view schematically showing the system configuration of the image processing apparatus.

A CPU 1001 controls the overall operation of the system, and executes programs stored in a primary storage unit 1002. The primary storage unit 1002 is mainly a memory which reads and stores programs and the like stored in a secondary storage unit 1003. The secondary storage unit 1003 corresponds to, for example, a hard disk. In general, a primary storage unit is smaller in capacity than a secondary storage unit. The secondary storage unit stores programs, data, and the like which the primary storage unit cannot afford to store. The secondary storage unit also stores data which needs to be stored for a long period of time. In this embodiment, the secondary storage unit 1003 stores programs, and when executing a program, the CPU 1001 loads the program into the primary storage unit 1002 and executes processing.

An input device 1004 corresponds to, for example, a card reader, a scanner, a film scanner, or the like which is required to input image data, as well as a mouse and a keyboard which are used to control the system. Examples of an output device 1005 are a monitor, a printer, and the like. The method of arranging this apparatus may take various forms. However, they do not relate to the gist of the present invention, and hence a description will be omitted. Assume that this embodiment uses a generally used mouse having left and right buttons as an input device.

The image processing apparatus is equipped with an operating system capable of parallel execution of a plurality of programs. The operator can operate a program operating on the image processing apparatus by using a GUI (Graphical User Interface).

The image processing apparatus in this embodiment can execute two processes as image editing processes. That is, one is a copy stamp process and the other is a repair process. The copy stamp process is a function of copying a partial region on a designated image onto another region which is designated separately. The repair process is the processing of detecting an isolated region matching a predetermined condition within a designated region and interpolating the isolated region with surrounding pixels.

In addition, the image processing apparatus has an automatic repair function of automatically executing a repair process for designated coordinates by using foreign substance correction data attached to image data in the digital camera body. These processes will be described in detail later.

Figure 11:
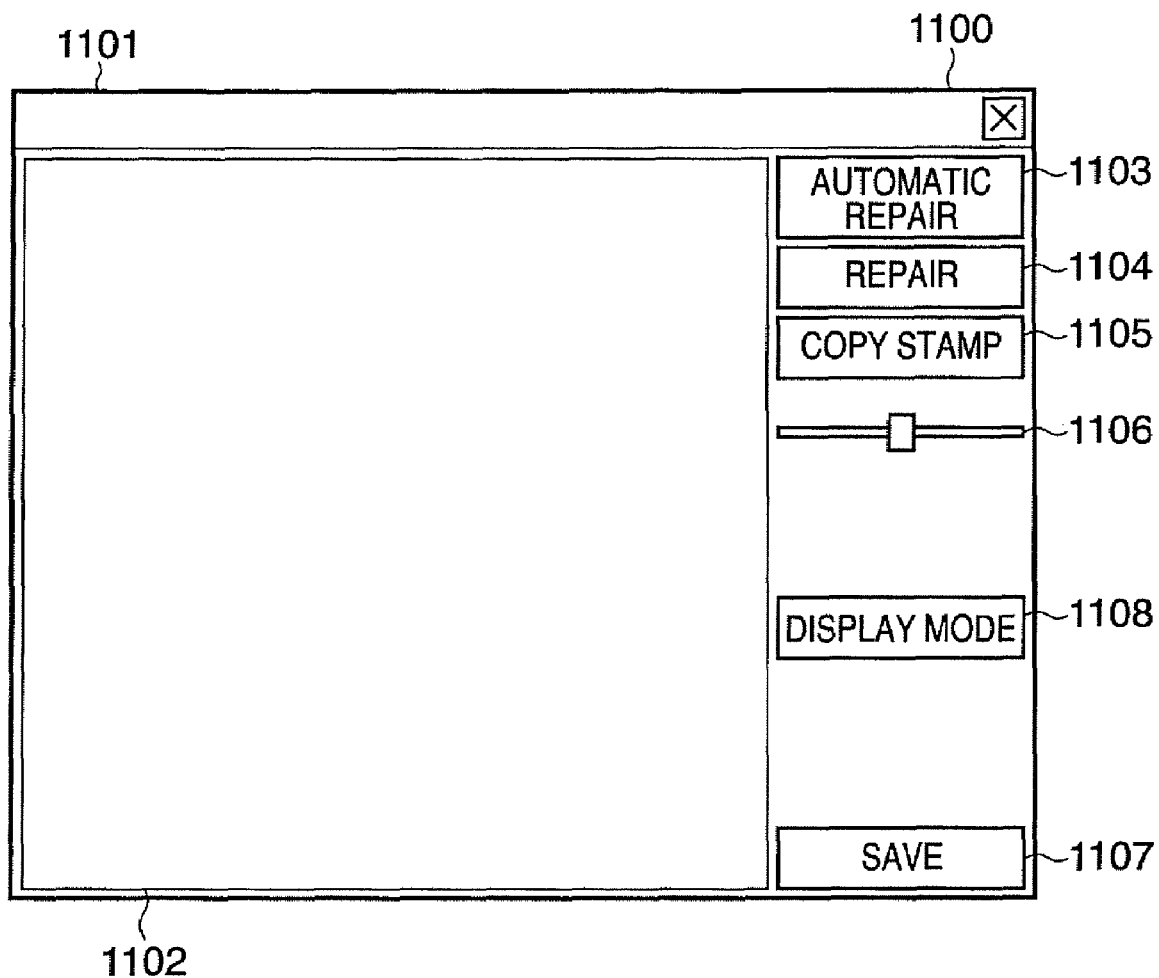
FIG. 11 is a view showing an example of a GUI in the image processing apparatus.

FIG. 11 is a view showing a GUI (Graphical User Interface) for an image editing program in the image processing apparatus. The window includes a close button 1100 and a title bar 1101. When the user presses the close button, he/she can terminate the program. When the user designates and determines an editing target image by dragging and dropping it in an image display region 1102, the CPU 1001 displays a file name on the title bar 1101 and then Fit-displays the target image in the image display region 1102.

The display state of an editing target image takes two modes, that is, a Fit display mode and a pixel one-to-one display mode, which can be switched by a display mode button 1108. According to this GUI, the user designates a modification position by clicking a corresponding portion on an image. In the Fit display mode, the CPU 1001 calculates coordinates on a modification image which correspond to the clicked position in accordance with a display magnification, and applies processing to the coordinates. With this GUI, the user designates a processing range with a radius, which is a radius on the editing target image. This radius sometimes differs from the radius on the image display in the Fit display mode depending on the display magnification.

When the user presses an automatic repair process execution button 1103, the CPU 1001 executes automatic foreign substance removing processing to be described later, and displays the processed image in the image display region 1102. The automatic repair process execution button 1103 is valid only when an image has not been edited, and is invalid when the image has been edited by the execution of a copy stamp process, a repair process, or an automatic repair process.

A radius slider 1106 is a slider by which the user designates application ranges for a copy stamp process and a repair process.

When the user presses a repair process mode button 1104, the repair process mode is set. When the user left-clicks on an image in the repair process mode, the CPU 1001 applies a repair process (to be described later) to a region centered on the left-clicked coordinates and has a radius corresponding to the number of pixels designated by the radius slider 1106. After the repair process is applied to the region, the repair process mode is canceled. When the user right-clicks on the image display region 1102 in the repair mode or presses any one of the buttons on the GUI, the repair mode is canceled.

When the user presses a copy stamp processing mode button 1105, the copy stamp mode is set. When the user left-clicks on an image in the copy stamp mode, the CPU 1001 sets the left-clicked coordinates as the central coordinates of a copy source region. When the user left-clicks on the image while the central coordinates of the copy source region are set, the CPU 1001 executes a copy stamp process upon setting the left-clicked coordinates as the central coordinates of the copy destination region and the radius designated by the radius slider 1106 at this time point as a copy radius. The CPU 1001 then cancels the copy stamp mode upon setting a state wherein the central coordinates of a copy source region have not been set. When the user right-clicks on the image display region 1102 in the copy stamp mode or presses any one of the buttons on the GUI, the CPU 1001 cancels the copy stamp mode upon setting a state wherein the central coordinates of a copy source region have not been set.

When the user presses a save button 1107, the CPU 1001 saves a processed image.

Figure 12:
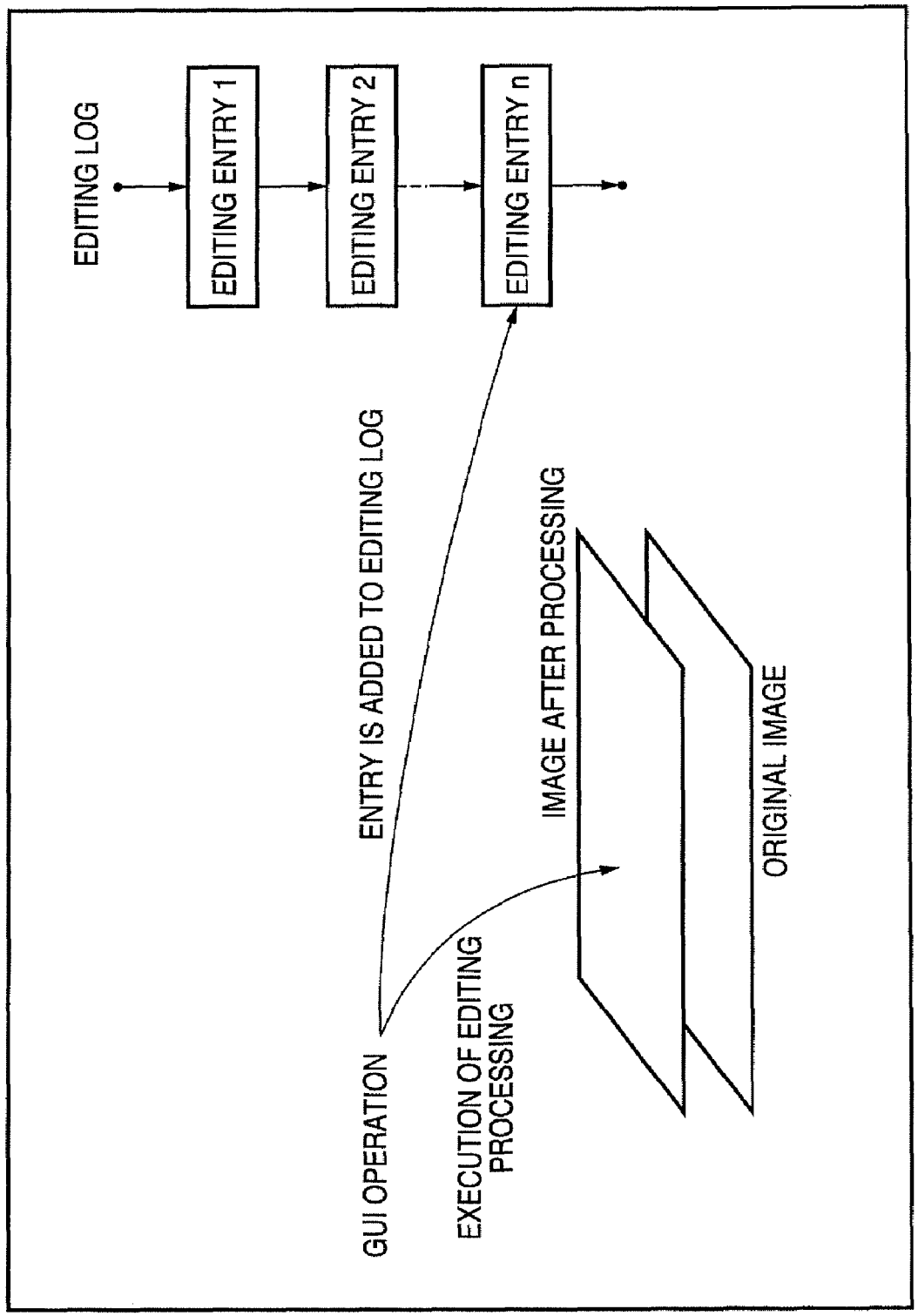
FIG. 12 is a view showing the internal structure of an image editing program.

According to the image editing program in this embodiment, as shown in FIG. 12, the CPU 1001 holds both an original image and an image after processes. The editing process designated by the GUI and used for editing of the image is registered in an editing log. One editing process registered in the editing log will be referred to as an editing entry.

FIG. 13 shows an example of en editing entry.

An editing entry in this embodiment holds a process ID for discriminating a copy stamp process or a repair process, a center and a radius which indicate a process application region, relative coordinates from copy source coordinates to copy destination coordinates which are required for a copy stamp process, and differential image data (to be described later). When executing an automatic repair process, the CPU 1001 executes a repair process in accordance with foreign substance correction data, and adds an editing entry to the editing log for every execution of a repair process.

Implementing these processes in this manner makes it possible to reconstruct an original image upon completely discarding an editing log and to cancel the immediately preceding editing process.

For example, it is possible to implement the processing of canceling an immediately preceding editing process by overwriting an temporarily processed image with an original image or re-executing the editing process up to an editing entry immediately before an editing entry as a cancellation target. If, however, the number of entries is very large, it takes much time to re-execute an editing process. For this reason, for every execution of editing operation, the CPU 1001 calculates the difference between image data before and after the execution of an editing process, and holds it in an editing entry. Holding a differential image allows return to the immediately preceding processed image by only reflecting the differential image corresponding to the cancellation target editing entry in the processed image instead of re-executing the editing process written in the editing entry from the beginning.

Each of a repair process and an automatic repair process will be described in detail next. Since a copy stamp process is a well known technique, a detailed description of the technique will be omitted.

A repair process is the processing of detecting an isolated region within a designated region and interpolating the isolated region. The CPU 1001 implements a repair process by applying an interpolation routine (to be described later) to a region expressed by the central coordinates and radius designated with the GUI.

Figure 14:
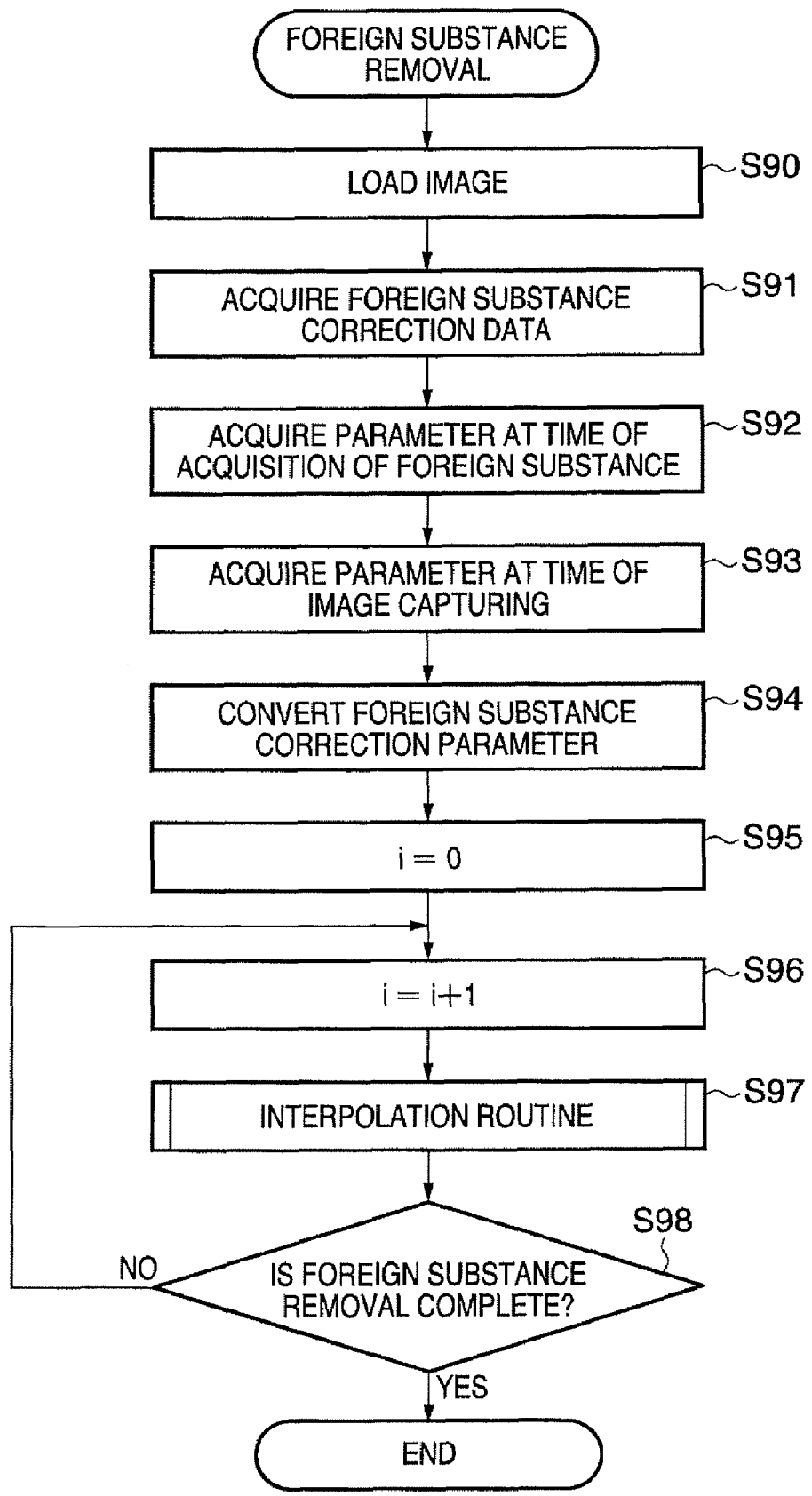
FIG. 14 is a flowchart for explaining a basic procedure of an automatic repair process.

In an automatic repair process, the CPU 1001 extracts foreign substance correction data from normally captured image data and automatically executes a repair process in accordance with foreign substance correction data. FIG. 14 shows a basic processing procedure for an automatic repair process.

First of all, the CPU 1001 loads normally captured image data to which foreign substance correction data is attached from the external storage device 419 in the digital camera or detached therefrom into the image processing apparatus and stores the data in the primary storage unit 1002 or the secondary storage unit 1003 (step S90).

The CPU 1001 then extracts the foreign substance correction data attached to the captured image from the normally captured image data (the image subjected to a foreign substance removing processing) in step S209 (step S91).

The CPU 1001 obtains a coordinate sequence Di (i=1, 2, . . . , n), a radius sequence Ri (i=1, 2, . . . , n), an aperture value f1, and a lens pupil position L1 from the foreign substance correction data extracted in step S91 (step S92). In this case, Ri represents the size of a foreign substance at the coordinates Di calculated in step S65 in FIG. 6.

In step S93, the CPU 1001 acquires an aperture value f2 and a lens pupil position L2 when the image has been normally captured, and converts Di according to the following equation in step S94. Let d be the distance from the center of the image to the coordinates Di and H be the distance from the surface of the image sensor 418 to a foreign substance. Coordinates Di' after conversion and a radius Ri' after conversion are given below:

$$Di'(x,y)=(L2\times(L1-H)\times d/((L2-H)\times L1))\times Di(x,y)$$

$$Ri=(Ri\times f1/f2+3)\times 2 \quad (1)$$

In this case, the unit is a pixel, and "+3" concerning Ri' represents a margin amount. The reason why (Ri×f1/f2+3) is doubled is that in order to detect a foreign substance region by using an average luminance, a region outside the foreign substance region is required.

In step S95, the CPU 1001 initializes an interpolation processing counter i to 0. In step S96, the CPU 1001 counts up i.

In step S97, the CPU 1001 executes an interpolation routine (to be described later) with respect to the region represented by the ith coordinates Di' and radius Ri' to remove a foreign substance in the region. In step S98, the CPU 1001 determines whether it has applied the foreign substance removing processing to all the coordinates. If the processing is complete for all the coordinates, the CPU 1001 terminates the processing. Otherwise, the process returns to step S96.

It is known that as the f-number at the time of image capturing decreases (approaches the full open aperture value), the foreign substance image becomes blurred and less noticeable. It is therefore conceivable to refer to the f-number at the time of image capturing before an automatic repair process and inhibit execution of all repair processes if this value is less than a threshold. This makes it possible to omit an analysis process and the like, thereby efficiently processing even a large number of editing target images. In addition, this can prevent degradation of image quality when an automatic repair process is performed for even an unnoticeable foreign substance. For example, this embodiment skips the above process when the f-number is less than f8 at which a foreign substance becomes unnoticeable.

Figure 15:
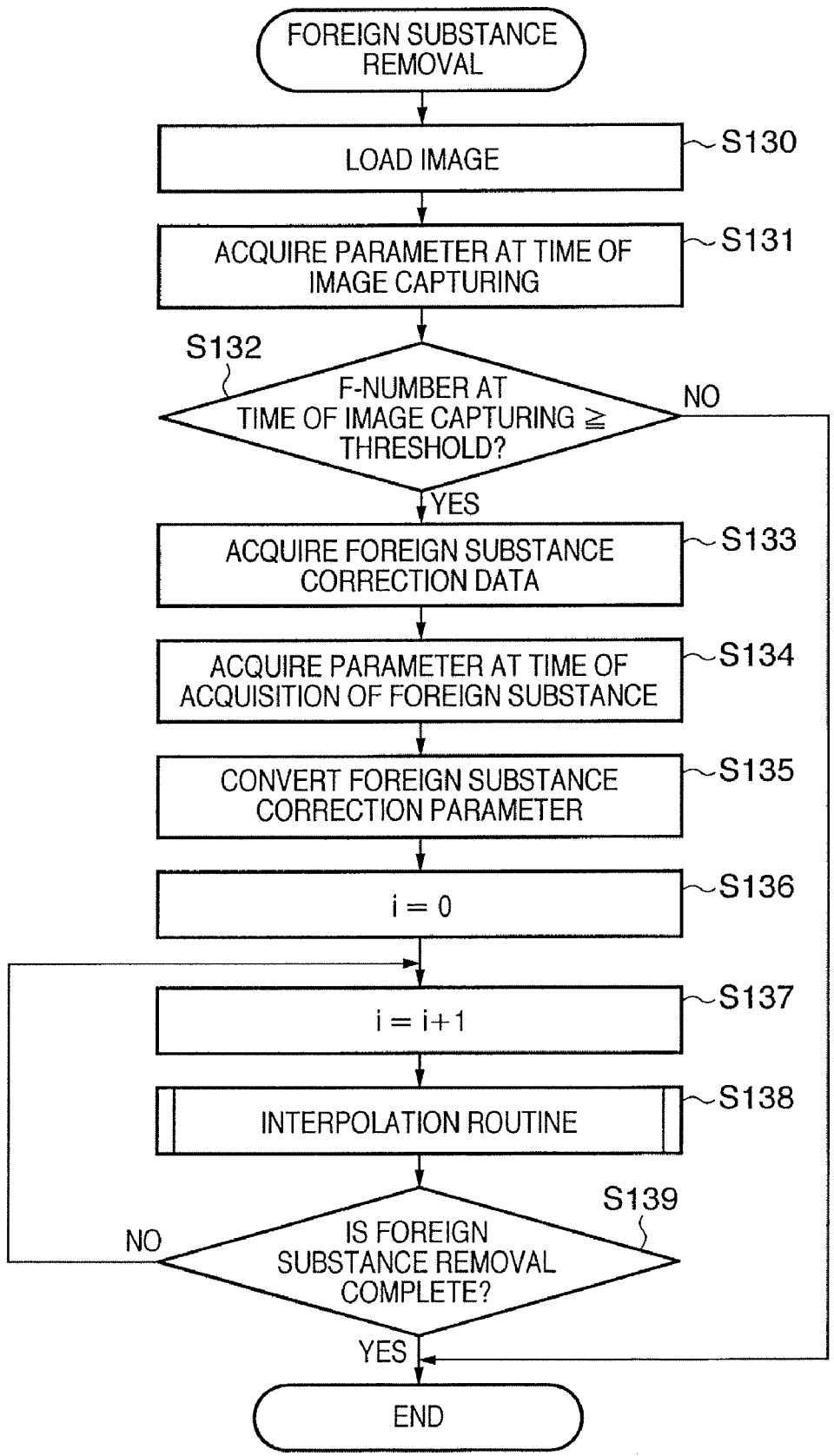
FIG. 15 is a flowchart showing a procedure of an automatic repair process in the first embodiment.

FIG. 15 shows an automatic repair process procedure modified in this manner.

This processing is the same as that shown in FIG. 14 except that the CPU 1001 skips an interpolation routine (step S138) when an aperture value at the time of image capturing, which is obtained by acquiring parameters at the time of image capturing before the execution of all processes, is compared with a threshold, and the aperture value is less than the threshold.

(Interpolation Routine)

An interpolation routine to be executed in a repair process and automatic repair process will be described below.

Figure 16:
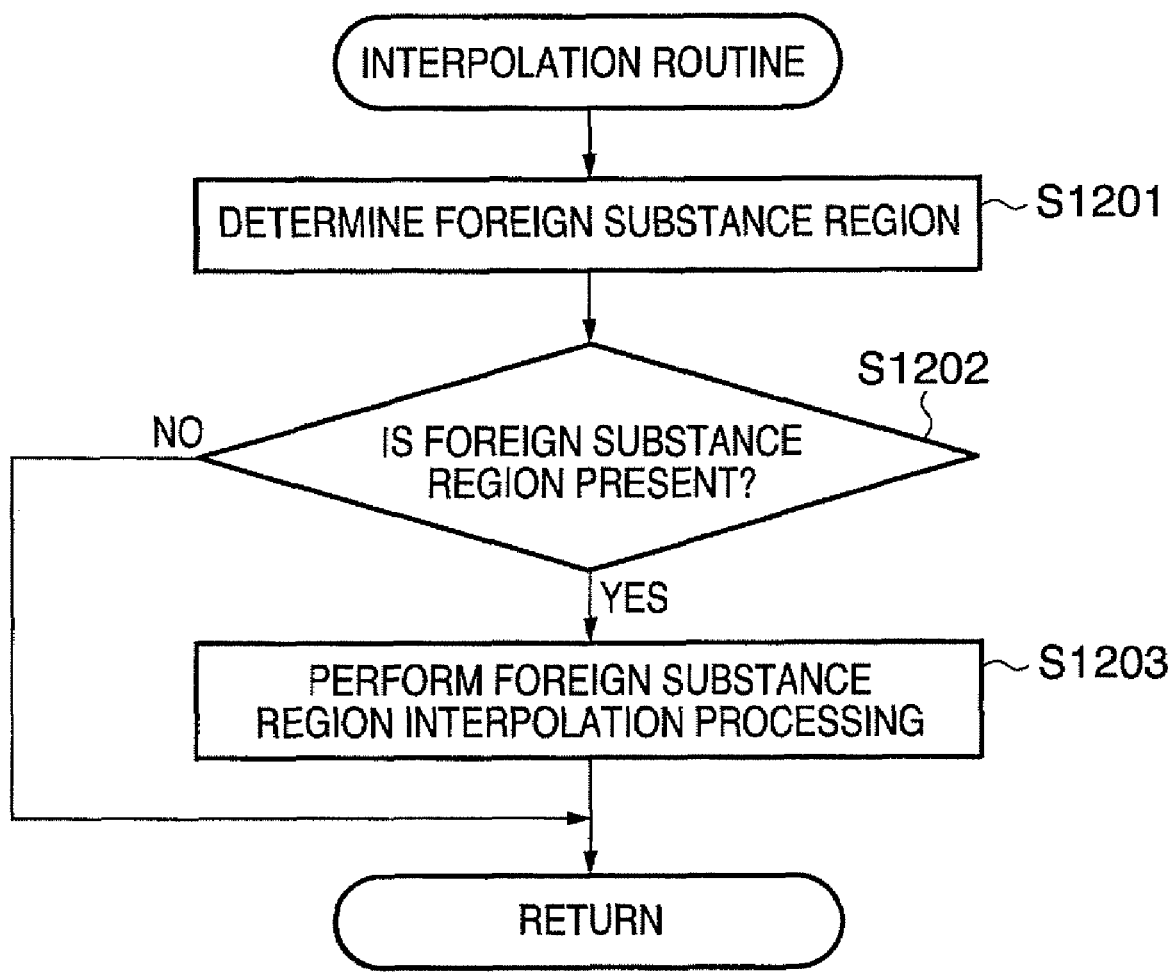
FIG. 16 is a flowchart for explaining the details of an interpolation routine.

FIG. 16 is a flowchart showing an interpolation routine procedure. First of all, in step S1201, the CPU 1001 performs foreign substance region determination. Let P be the central coordinates of a region as a target for a repair process, and let R be a radius. Assume that a foreign substance region is a region satisfying all the following conditions:

(1) a region which is darker than a threshold T2 obtained by using an average luminance Yave and a maximum luminance Ymax of pixels contained in a repair process target region:

$$T2=Yave\times 0.6+Ymax\times 0.4$$

(2) a region which is not in contact with a circle represented by the above central coordinates P and radius R; and (3) a region whose radius value calculated by the same method as that in step S63 in FIG. 6 is equal to or more than l1 pixels and less than l2 pixels, with respect to an isolated region comprising a pixel lower in luminance than that selected in (1).

In an automatic repair process, a region which satisfies condition (4) in addition to the above conditions is a foreign substance region:

(4) a region which includes central coordinates P of a circle.

In this embodiment, l1 represents three pixels, and l2 represents 30 pixels. This makes it possible to handle only an isolated small region as a foreign substance.

If the CPU 1001 determines in step S1202 that there is such a region, the process advances to step S1203 to perform foreign substance region interpolation. Otherwise, the CPU 1001 terminates the processing. The CPU 1001 executes the foreign substance region interpolation processing in step S1203 by a known defect region interpolation method. For example, as a known defect region interpolation method, the pattern replacement disclosed in Japanese Patent Laid-Open No. 2001-223894 is available. The technique disclosed in Japanese Patent Laid-Open No. 2001-223894 specifies a defect region by using infrared light. In contrast, this embodiment handles the foreign substance region detected in step S1201 as a defect region, and interpolates the foreign substance with surrounding normal pixels by pattern replacement. With regard to a pixel which cannot be interpolated by pattern replacement, the corresponding image data after pattern replacement is interpolated by using the average color of p normal pixels selected in descending order of distance from the interpolation target pixel and of q normal pixels selected in ascending order of distance.

As described above, attaching foreign substance correction data to an image leads to the merit of eliminating the necessity to be conscious of the correspondence between foreign substance correction image data and captured image data. In addition, since foreign substance correction data is compact data comprising a position, a size, and conversion data (an aperture value and distance information concerning the pupil position of the lens), the captured image data size will not be extremely large. Furthermore, performing interpolation processing for only a region containing a pixel designated by foreign substance correction data makes it possible to greatly reduce the probability of erroneous detection. Moreover, controlling the execution/non-execution of an automatic repair process in accordance with the f-number at the time of image capturing can perform more suitable processing.

Second Embodiment

In an automatic repair process in the first embodiment, it is simply determined from the f-number at the time of image capturing whether to apply foreign substance removing processing. In practice, however, as a foreign substance becomes larger, the substance becomes more noticeable, and hence an automatic repair process can be performed more properly by determining from a combination of an f-number and the size of a foreign substance whether to apply foreign substance removing processing, although the execution time cannot be shortened much.

Figure 17:
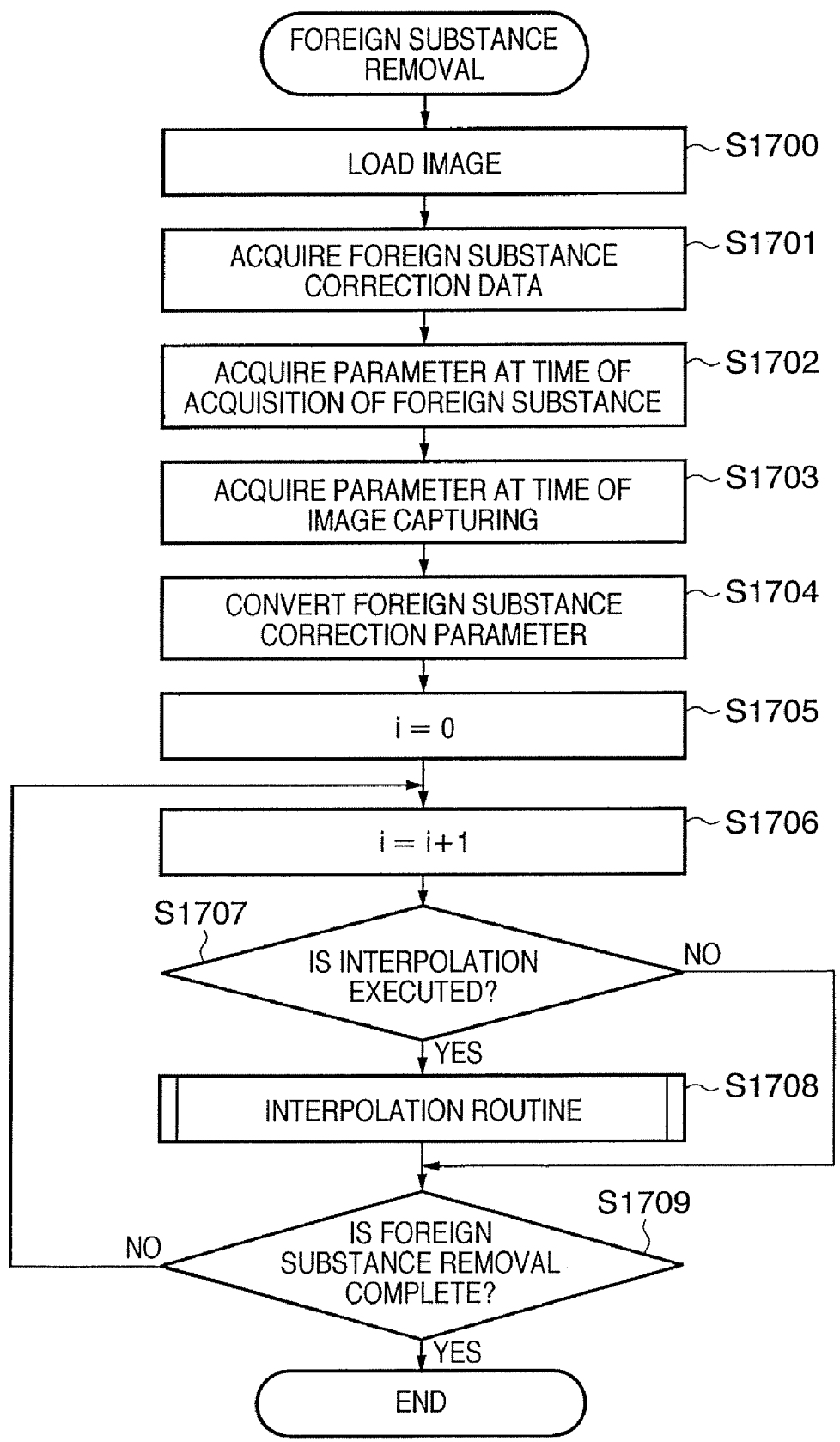
FIG. 17 is a flowchart showing a procedure of an automatic repair process in the second embodiment.

FIG. 17 shows an automatic repair process procedure in this embodiment. A rough processing procedure in FIG. 17 is the same as that shown in FIG. 14 except that the processing of determining whether to execute an interpolation routine is set before the execution of the interpolation routine. In the execution determination processing in step S1707, for example, the CPU determines whether to execute an interpolation routine depending on whether the following inequality is satisfied:

$$\beta > \sqrt{[f2]}/(\sqrt{[f1]} \times Ri) \quad (2)$$

where f1 is the f-number at the time of image capturing, f2 is the f-number at the time of capturing a foreign substance correction image, Ri is the radius of the ith foreign substance, and β is a predetermined value.

Assume that in this embodiment, β is 10. In step S1707, the CPU determines whether inequality (1) is satisfied. If YES in step S1707, the process advances to step S1708 to execute interpolation processing. Otherwise, the process skips interpolation processing.

Note that the determination in step S1707 has the following meaning. The right-hand side of inequality (1) decreases as the f-number at the time of image capturing increases (the stop is stopped down) and the radius Ri of a foreign substance increases. That is, the right-hand side of inequality (1) becomes smaller than a predetermined value of β when the stop is stopped down at the time of image capturing and a foreign substance is large in size and noticeable. As a consequence, the interpolation processing in step S1708 is executed. That is, the determination in step S1707 indicates that only when a foreign substance is noticeable, interpolation processing for the foreign substance region is performed.

Execution of interpolation processing in accordance with conditions in this manner can allow obtaining a more suitable interpolation result. This embodiment focuses on only the radius value of a foreign substance region in addition to an aperture value. However, it suffices to calculate the luminance difference between a foreign substance region and its neighboring region upon detection of a foreign substance, store it in foreign substance correction data, and use it for execution determination processing in an interpolation routine. In some cases, when a thin foreign substance is captured with an aperture value close to the full open aperture value, the foreign substance may not be noticeable. In this case, for example, it is conceivable to skip the processing.

Third Embodiment

According to the automatic repair process described in the first embodiment, when an automatic repair process is executed, an attempt is made to repair all designated coordinates. If, however, a designated region having a complicated pattern inside is interpolated, the interpolation result may look unnatural. A designated region having a complicated pattern may be a region with a lawn. This embodiment therefore determines at the time of execution of an automatic repair process whether the inside of a designated region comprises pixels which are uniform to some extent, and executes a repair process for only a region which is uniform to some extent. A uniform region includes, for example, a sky or a plain wall surface in a scenery image.

Figure 18:
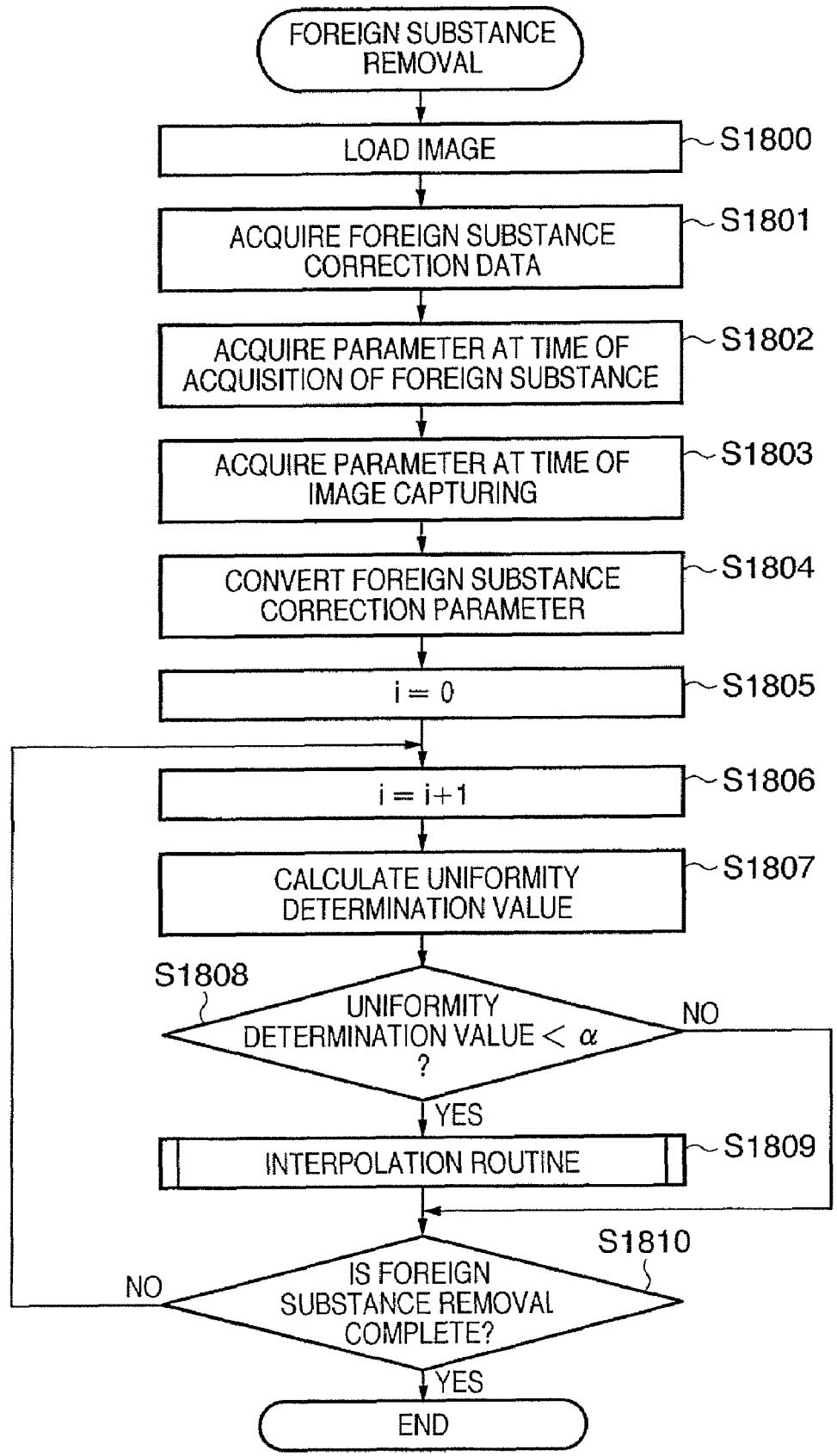
FIG. 18 is a flowchart showing a procedure of an automatic repair process in the third embodiment.

As shown in FIG. 18, therefore, before executing the interpolation routine in step S1809, the CPU calculates a uniformity determination value of a region other than a foreign substance region in step S1807. In step S1808, the CPU determines whether this value is equal to or less than a threshold α. Only when the value is equal to or less than the threshold α, the CPU executes a repair process according to the interpolation routine in step S1809.

In this case, the threshold α is a threshold with respect to the average value of amounts of change in luminance due to filter processing (to be described later). Applying filter processing (to be described) to a region will blur an isolated point or strong edge portion due to noise or the like. In contrast, even if filter processing is applied to a flat portion, the luminance does not change much. Therefore, the calculated luminance difference between regions before and after the application of filter processing can be used to determine whether the region of interest is flat. If the luminance difference between the regions before and after the application of the filter processing is smaller than the threshold α, the CPU determines that the region is flat. In this embodiment, if pixel values fall within the eight-bit accuracy, the threshold α is, for example, six.

Figure 19:
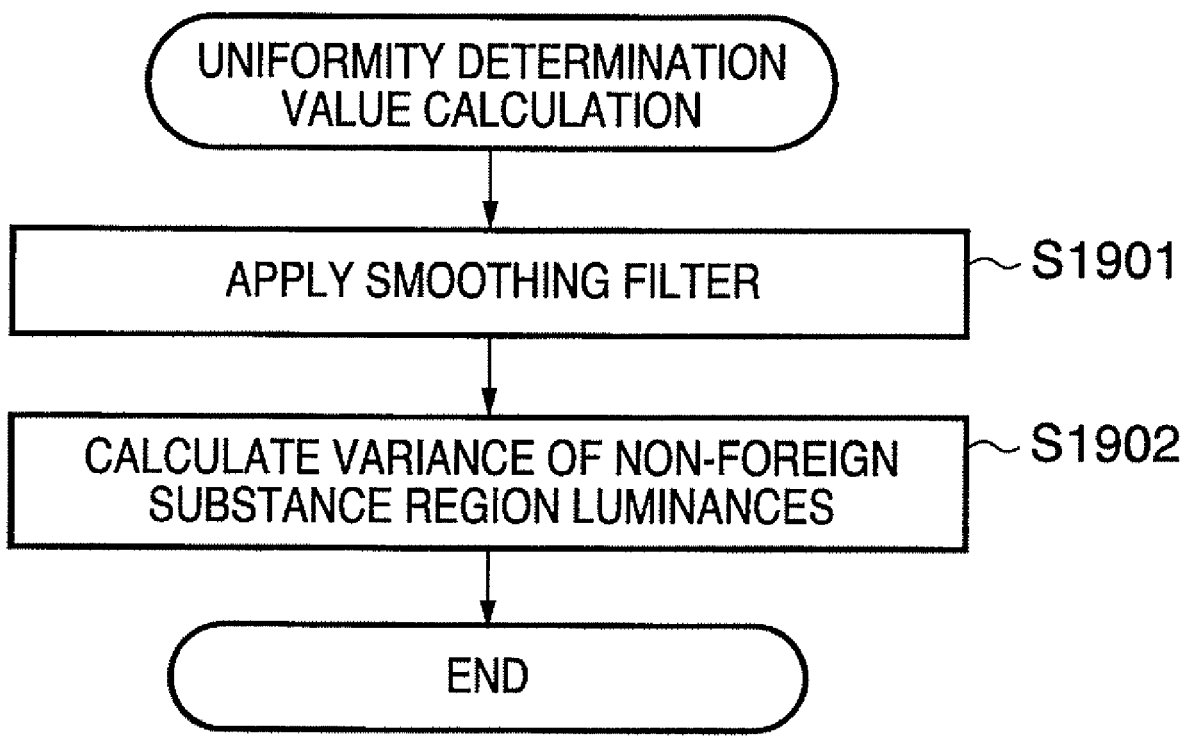
FIG. 19 is a flowchart showing a uniformity determination value calculation processing procedure in the third embodiment.

FIG. 19 is a flowchart showing a procedure for uniformity determination value calculation processing in this embodiment.

In step S1901, the CPU obtains bitmap data comprising luminance components after the application of a filter by applying the filter shown in FIG. 20A to the luminance components of the respective pixels within a designated region. The CPU calculates a luminance component according to the following equation:

$$Y = 0.299 \times R + 0.587 \times G + 0.114 \times B \quad (3)$$

Assume that the filter in FIG. 20A is a smoothing filter, and the CPU obtains a new pixel value for a pixel of interest by uniformly weighting nine pixels, that is, the upper left pixel, upper pixel, upper right pixel, left pixel, pixel of interest, right pixel, lower left pixel, lower pixel, and lower right pixel, and averaging the sum of pixel values.

In step S1902, the CPU calculates the variance of luminance values of pixels, of the bitmap data generated in step S1901, which are not contained in the foreign substance region, after the application of the filter, and uses the variance as a uniformity determination value for the region.

Obviously, it suffices to perform filter processing by using coefficients other than those shown in FIG. 20A as long as a smoothing filter for luminance components is used.

Performing such processing makes it possible to perform proper interpolation processing by extracting a uniform region while the influence of noise components of a captured image which occurs when the set ISO sensitivity is high is eliminated to some extent.

Fourth Embodiment

The third embodiment eliminates the influence of noise in the case of a high ISO sensitivity by using filter processing. In order to further suppress the influence of noise, as described in this embodiment, it suffices to prepare a plurality of smoothing filters for luminance components and calculate a uniformity determination value by obtaining the difference between luminance bitmap data obtained by the filters.

Figure 21:
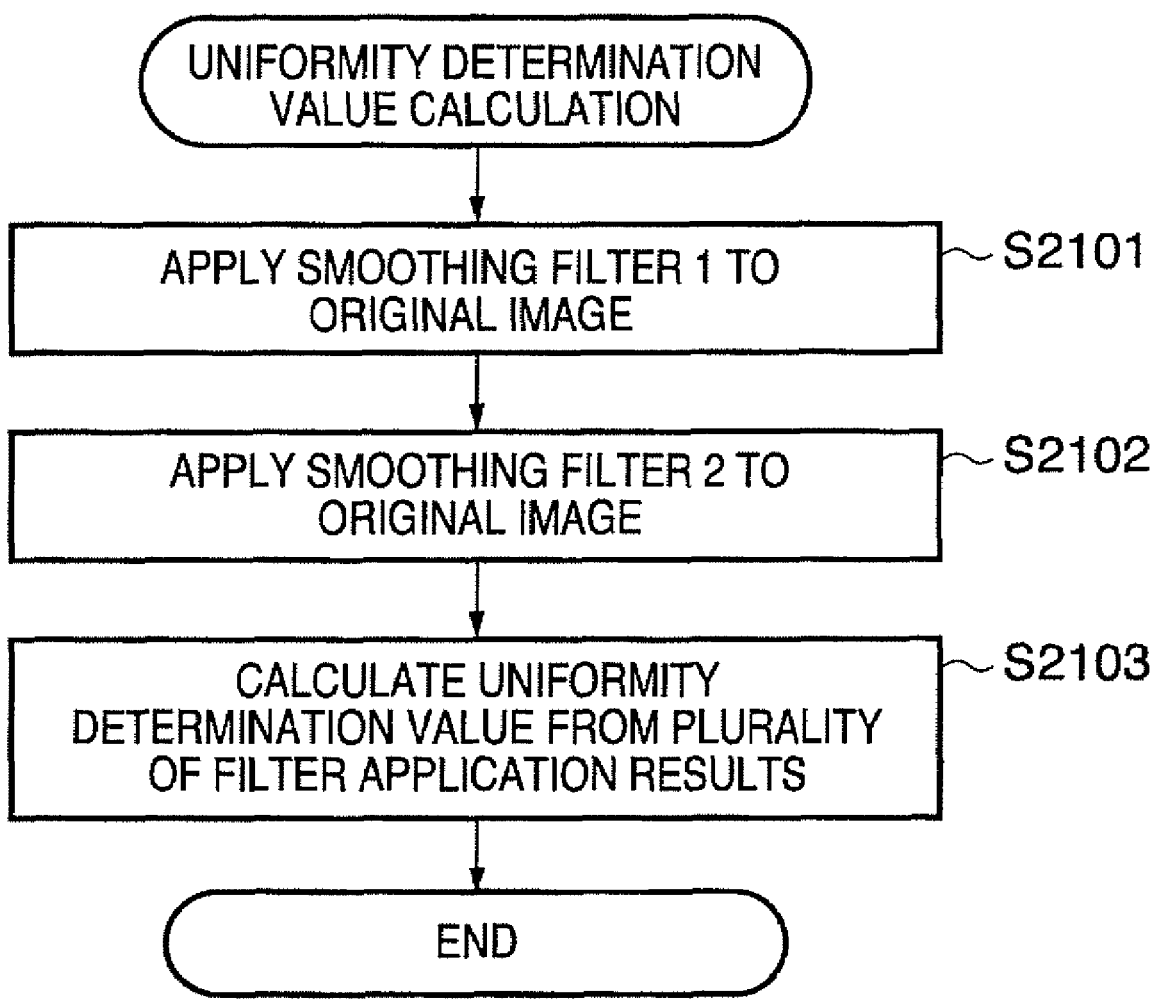
FIG. 21 is a flowchart showing a uniformity determination value calculation processing procedure in the fourth embodiment.

This embodiment will exemplify uniformity determination value calculation processing using two kinds of smoothing filters. FIG. 21 shows a flowchart for uniformity determination value calculation processing.

In step S2101, the CPU applies the filter shown in FIG. 20A to the luminance components of the respective pixels in a designated region and obtains first bitmap data comprising luminance components after the application of the filter.

In step S2102, the CPU applies the filter shown in FIG. 20B to the luminance components of the respective pixels in a designated region and obtains second bitmap data comprising luminance components after the application of the filter. Note that the filter in FIG. 20B is used to uniformly weight 25 pixels including a pixel of interest and neighboring pixels and obtain a new pixel value for the pixel of interest by averaging the sum of the pixel values.

In step S2103, the CPU calculates the average value of differences between corresponding pixels of the first and second bitmap data, and sets it as a uniformity determination value.

Performing such processing makes it possible to perform proper interpolation processing by extracting a uniform region while the influence of noise components on a captured image is eliminated.

Fifth Embodiment

The third and fourth embodiments have exemplified the case wherein when the uniformity of a target region is to be determined, filter processing is applied to the entire target region.

The methods according to the third and fourth embodiments use smoothing filters, and hence cannot sometimes accurately determine uniformity with respect to an image with large luminance noise. This embodiment therefore divides a designated region into blocks, and obtains a uniformity determination value for each block, thereby improving the accuracy of detection of a uniform region.

Figure 22:
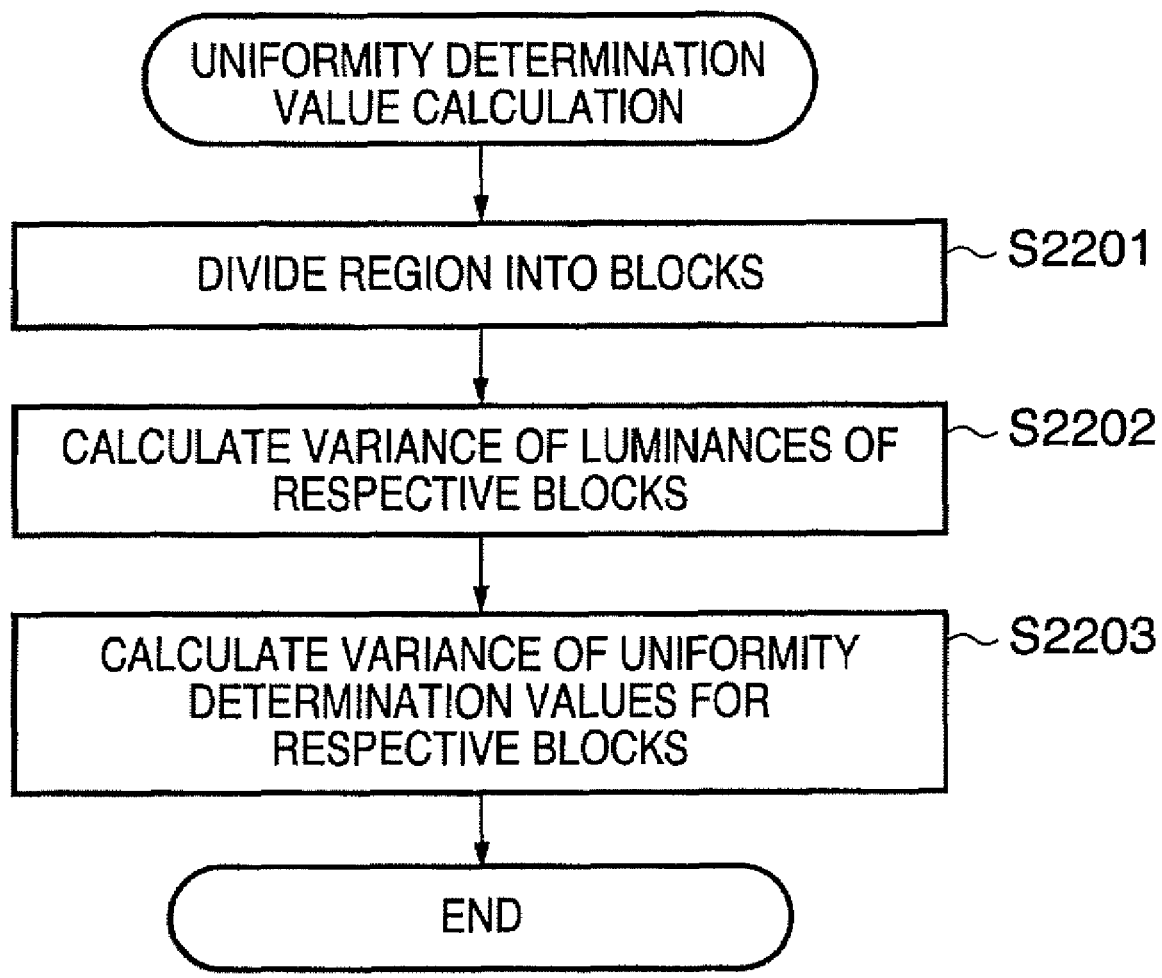
FIG. 22 is a flowchart showing a uniformity determination value calculation processing procedure in the fifth embodiment.

FIG. 22 is a flowchart showing a procedure for uniformity determination value calculation processing in this embodiment.

First of all, in step S2201, the CPU divides a designated region into blocks each having a predetermined size. For example, in this embodiment, the block size is set to eight pixels in the vertical direction and eight pixels in the horizontal direction.

In step S2202, the CPU obtains the variance of effective pixel luminance values with respect to each block containing effective pixels equal to or more than $\mu$ pixels. In this case, an effective pixel is a pixel which is not contained in a foreign substance region, and is contained in a region designated as a repair process target. Assume that in this embodiment, $\mu$ is 32.

Finally, in step S2203, the CPU calculates the variance of uniformity determination values for the respective blocks, and sets the variance as a uniformity determination value for the region designated as a repair process target.

Performing such processing makes it possible to obtain a region with high uniformity regardless of the amount of noise.

Figure 23:
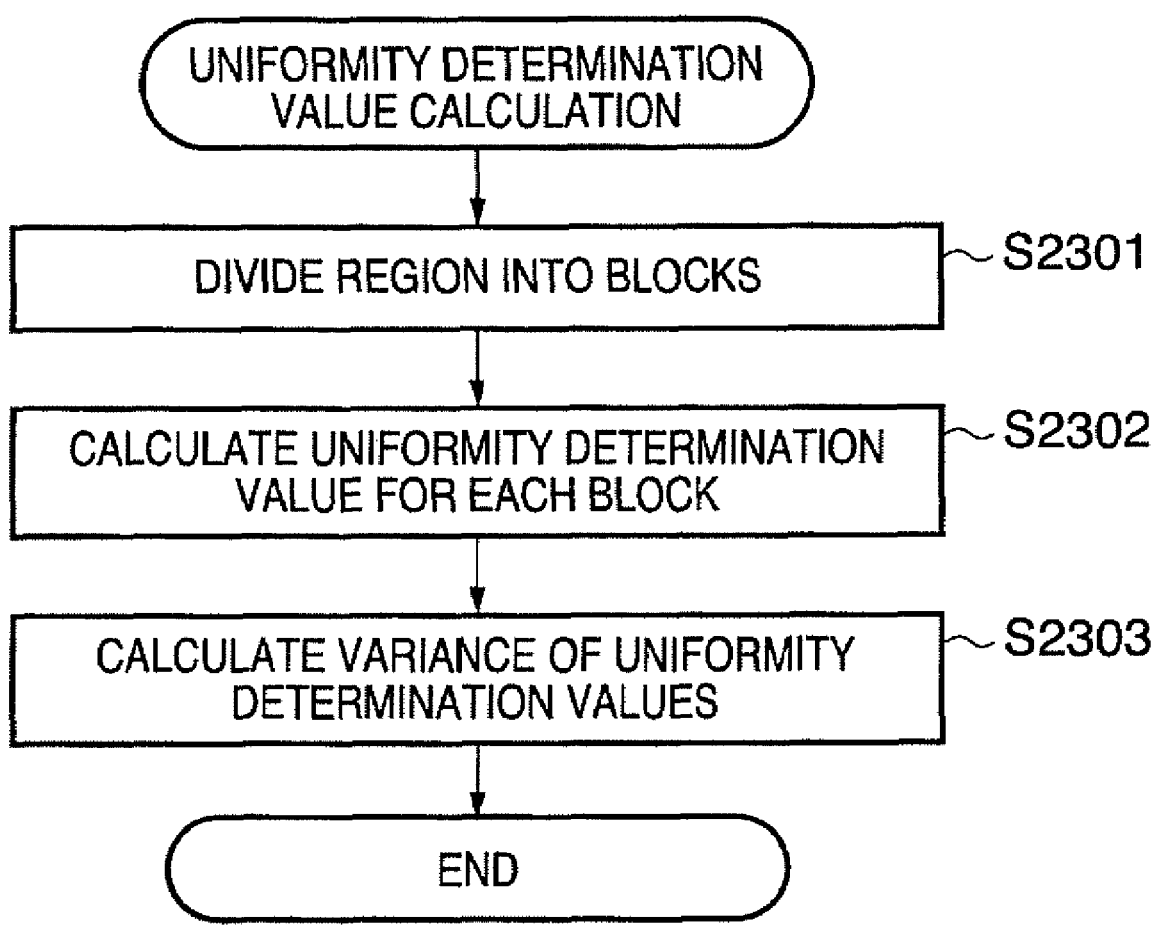
FIG. 23 is a flowchart showing a modification of the uniformity determination value calculation processing procedure in the fifth embodiment.

It is further conceivable to obtain uniformity determination values for the respective blocks and calculate the variance of them, as shown in FIG. 23. The methods according to the third and fourth embodiments may determine even a region containing a portion which is locally non-uniform as a uniform region. However, using the method of the fifth embodiment can solve such a problem. The scheme shown in FIG. 22 determines even a region with a large amount of noise as a uniform region as long as it is uniform as a whole. In contrast, the scheme shown in FIG. 23 can discriminate only a portion whose noise amount is small to some extent.

Sixth Embodiment

When an automatic repair process is executed according to the image editing program in the first embodiment, part of an application result may be an inappropriate interpolation result. The sixth embodiment will exemplify a method of canceling an editing process when part of interpolation is inappropriate.

Figure 24:
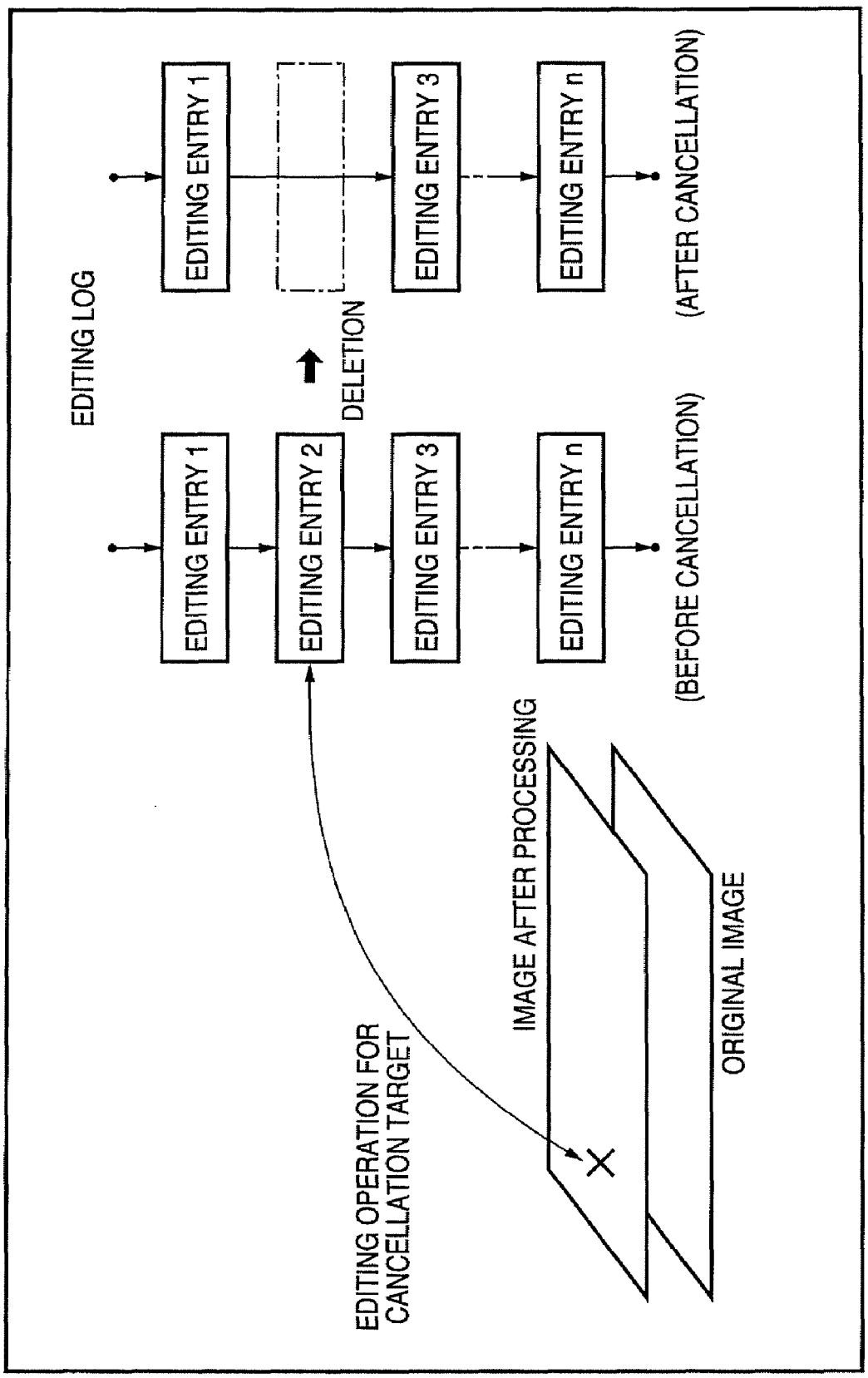
FIG. 24 is a view for explaining the details of cancellation processing for editing processing.
Figure 25:
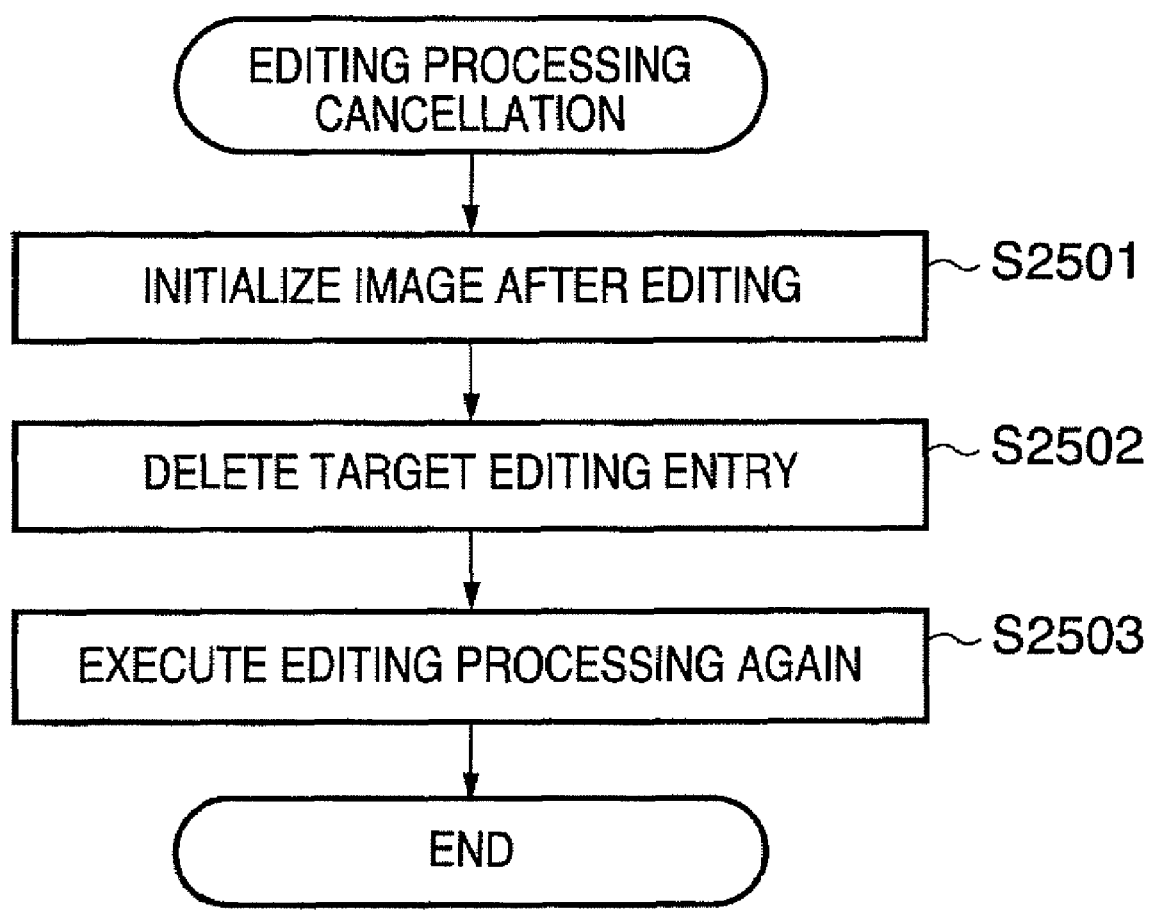
FIG. 25 is a flowchart for explaining an image processing procedure to be executed after the cancellation of editing processing.

An image editing program of this embodiment holds an original image and an entire editing log, as described in the first embodiment. Therefore, as shown in FIG. 24, an editing entry corresponding to editing contents to be canceled is deleted from an editing log, and an image after processing is generated from the original image and the editing log from which the editing entry to be canceled is deleted. FIG. 25 shows a flowchart for editing content cancellation processing.

In step S2501, the CPU copies the original image on an image after processing, and initializes the image after processing. In step S2502, the CPU deletes a target editing entry from an editing log. Finally, in step S2503, the CPU executes editing processing recorded in a new editing log with respect to the initialized image.

Executing this processing makes it possible to obtain image data in a state wherein only the editing contents corresponding to the deleted entry are canceled. Subsequently, canceling editing contents by deleting a specific editing entry will be simply expressed as "canceling editing processing".

Figure 26:
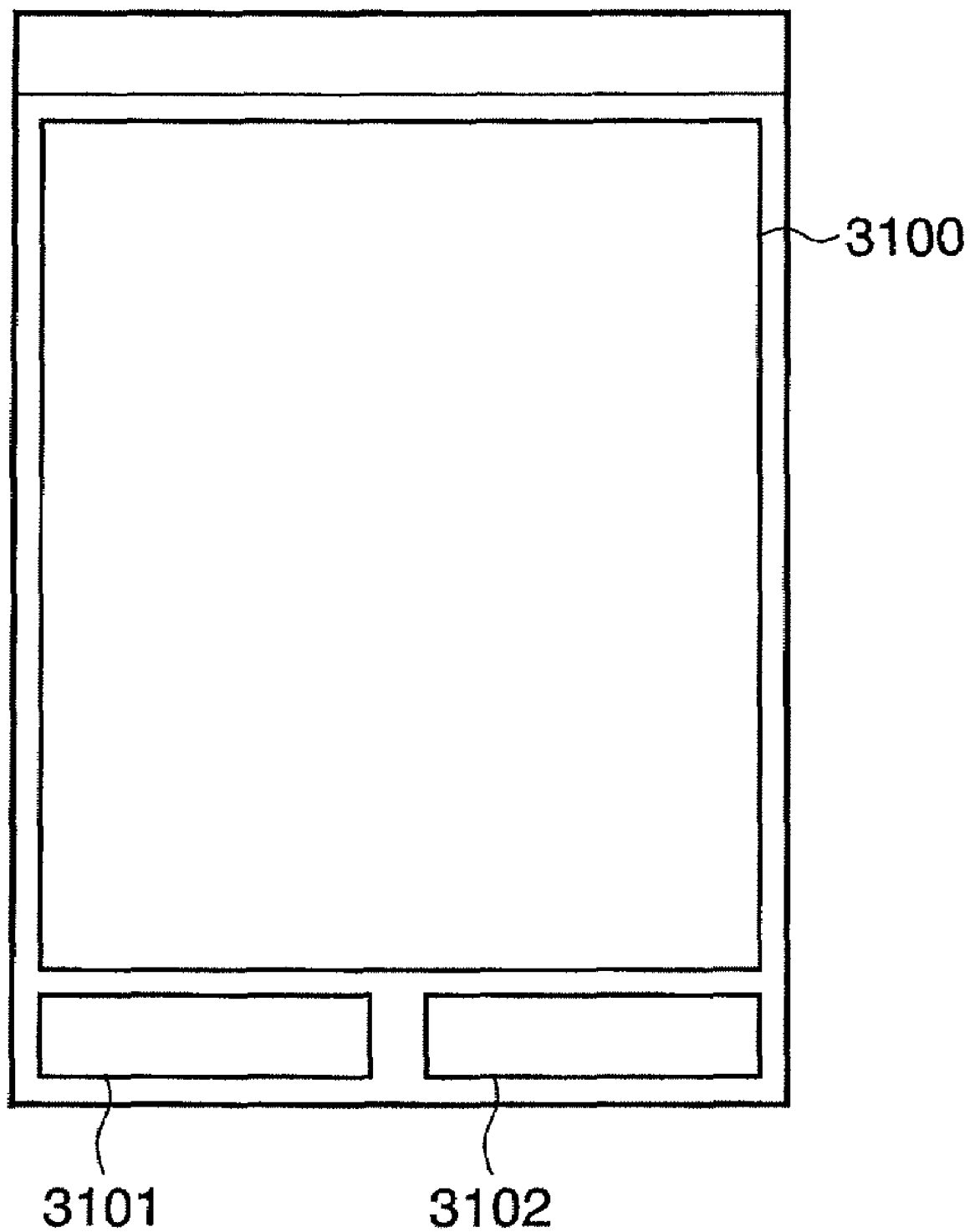
FIG. 26 is a view showing an example of a cancellation designation dialog.

FIG. 26 shows an example of a cancellation designation dialog for designating the cancellation of editing processing.

When the user performs a specific key operation (e.g., Ctrl+D) in an image editing program, the CPU displays a cancellation designation dialog as a modal dialog. An editing log display unit 3100 displays editing entries in the form of a list in the order in which they are registered in an editing log. The list displays serial numbers and editing contents (a repair process or a copy stamp process). Note that the editing log display unit 3100 is displayed on part of an image display region 1102 shown in FIG. 11. When the user selects an editing entry display on the list, the CPU displays the corresponding editing portion on the image display region 1102 upon circling it to present the user which part is selected. When the user presses a cancellation designation button 3101, the CPU cancels editing processing corresponding to the selected editing entry. When the user presses a window erase button 3102, the CPU closes the dialog.

However, a problem arises when entire editing processing is unconditionally canceled.

An image editing program in this embodiment comprises a function of performing a copy stamp process. If editing processing is canceled while a region for which editing processing is canceled is designated as a copy source region for a copy stamp process, image data before the removal of a foreign substance is copied to a copy destination region. In addition, the copy destination region may also be designated as a copy source for another copy stamp process.

FIGS. 27A to 27D are views for explaining this problem.

Figure 27A:
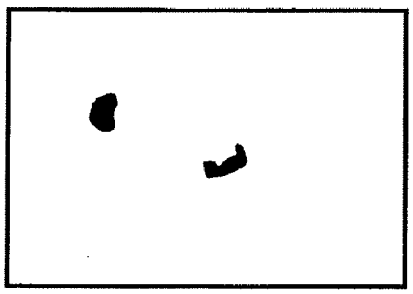
FIGS. 27A to 27D are views for explaining a phenomenon in a case wherein editing processing applied to a region designated as a copy source region is cancelled.
Figure 27B:
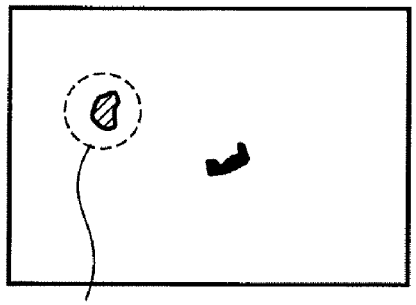
Figure 27C:
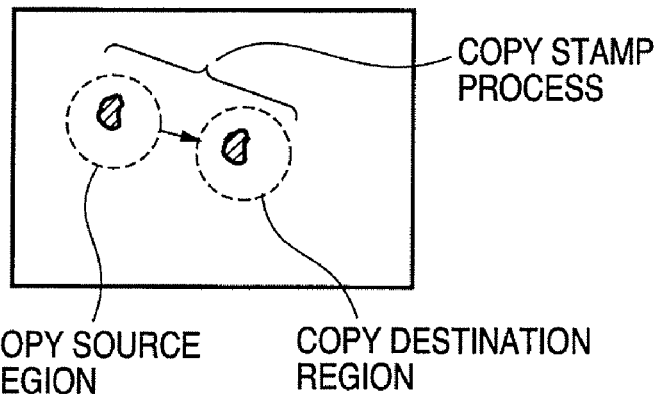
Figure 27D:
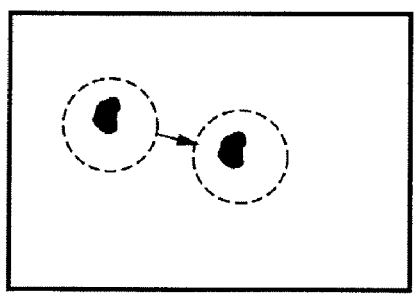

Assume that there are two foreign substances in an initial state. Assume that these foreign substances are the black regions in FIG. 27A. As shown in FIG. 27B, a repair process is performed for one of these regions. As is obvious from FIGS. 27B and 27C, the regions having undergone repair processes are indicated by the oblique lines. Subsequently, as shown in FIG. 27C, the other region is deleted by using this interpolation result. When an editing entry for the repair process performed in FIG. 27B is deleted, no repair process is performed. The foreign substance regions which have been repair process targets are copied, as shown in FIG. 27D.

This embodiment therefore provides the processing of determining whether to cancel editing processing. More specifically, if an editing log includes the processing of referring to a pixel at the coordinates designated in advance as in a copy stamp process, the cancellation of editing processing is inhibited.

A repair process is a process which is complete within a region twice as large as a radius on an algorithm, and interpolation processing is executed by adaptively selecting pixels in accordance with the state of a surrounding region. If, therefore, an editing log comprises only a repair process, cancellation of an arbitrary editing process poses no problem.

Figure 28:
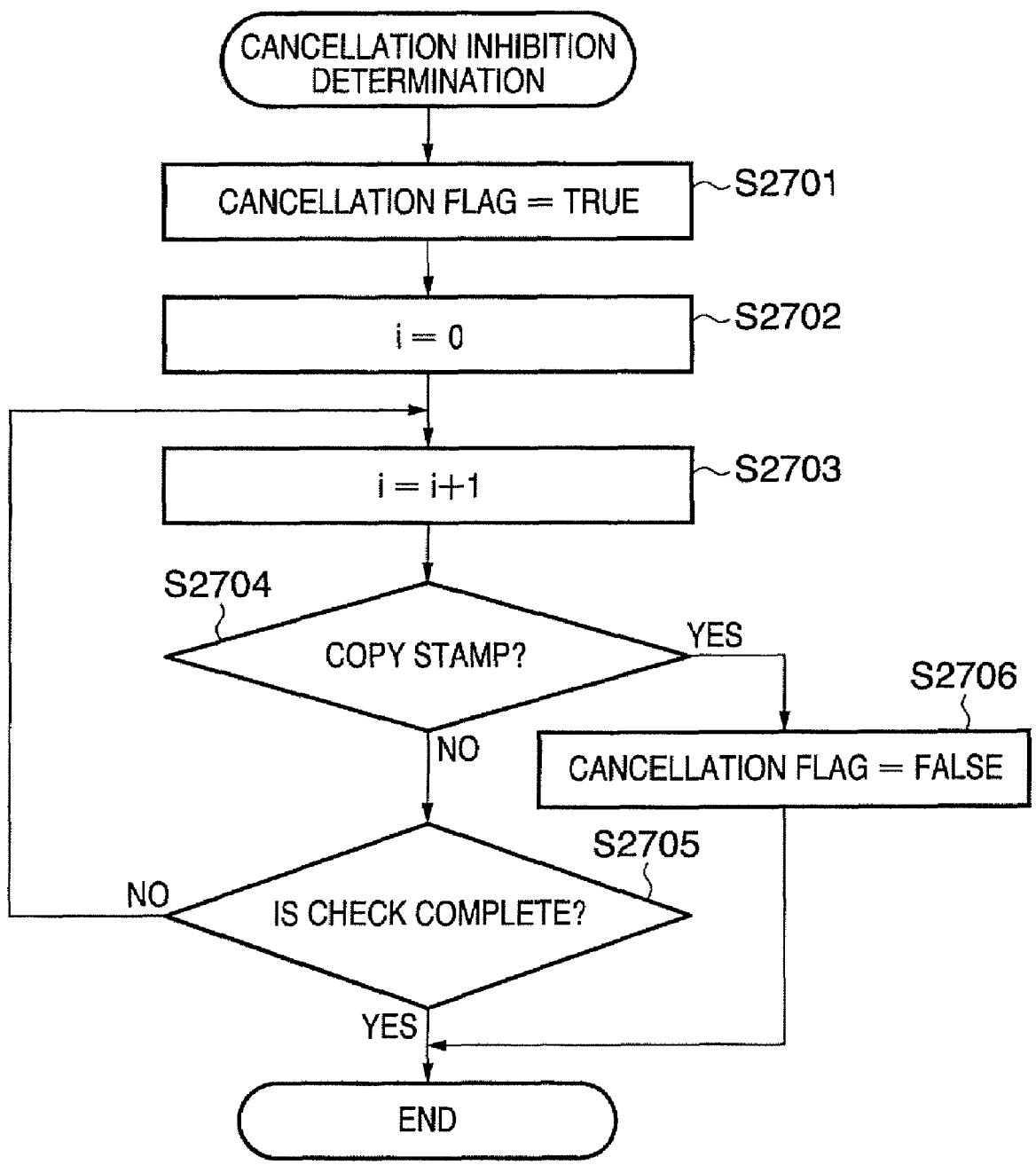
FIG. 28 is a flowchart for explaining the details of cancellation inhibition determination processing.

FIG. 28 is a flowchart showing a procedure of cancellation inhibition determination processing in editing processing in this embodiment.

In step S2701, the CPU initializes a cancellation flag to TRUE. In step S2702, the CPU initializes a counter i. In step S2703, the CPU counts up the counter i. In step S2704, the CPU checks whether the ith editing entry is a copy stamp process. If NO in step S2704, the process advances to step S2705. If YES in step S2704, the process advances to step S2706. In step S2705, the CPU checks whether all the editing entries are checked. If NO in step S2705, the process returns to step S2703. Otherwise, the CPU terminates the processing. In step S2706, since an editing log includes a copy stamp process, the CPU sets the cancellation flag to FALSE and terminates the processing. As a result of this processing, the CPU permits the cancellation of editing processing only when the cancellation flag is TRUE.

Assume that when the CPU checks all the editing entries for copy stamp processes included in the editing log, not all the editing entries for the copy stamp processes include portions modified by copy stamp processes as copy source regions. In this case, it is possible to perform cancellation processing for editing contents. From the viewpoint of the user of the image processing program, however, it is very complicated to determine whether to inhibit canceling operation for an editing entry, and hence it is very difficult to use such determination processing. If, for example, an editing entry includes both a repair process and a copy stamp process, it is difficult to determine whether the editing state can be canceled, even if the editing log is displayed in the form of a list. The determination method in this embodiment inhibits the cancellation of an editing entry if a copy stamp process has been executed at least once, and hence allows the user to easily comprehend a cancellation inhibition condition for an editing entry.

Seventh Embodiment

This embodiment will exemplify the processing of updating foreign substance correction data upon cancellation of editing processing in the sixth embodiment.

In some case, when a user fixes a camera on a tripod to capture a still object in a studio, there are a plurality of cuts with almost the same composition. Assume that an automatic repair process is performed for one of such images, and some portion exhibits an inappropriate interpolation result. In this case, the remaining images may have the same result.

It is therefore conceivable to add a cancellation flag (e.g., one byte) indicating whether editing processing has been canceled to parameters for a foreign substance region which are stored in foreign substance correction data and, if editing processing has been canceled, set the cancellation flag for the corresponding foreign substance region. In an automatic repair process, the processing is skipped for a foreign substance region in which the cancellation flag is set. Introducing such a mechanism makes it possible to shorten the operation time required for the cancellation of editing processing by excluding in advance portions which may have inappropriate results from processing targets.

FIG. 29 shows an example of foreign substance correction data in this embodiment. Note, however, that foreign substance correction data to be recorded on the camera body may remain in the state shown in FIG. 5. In this case, when foreign substance correction data to be executed by the image editing program is acquired (e.g., step S91 in FIG. 14), the data may be converted into the form shown in FIG. 29. Assume that the initial state of the cancellation flag is FALSE.

Figure 30:
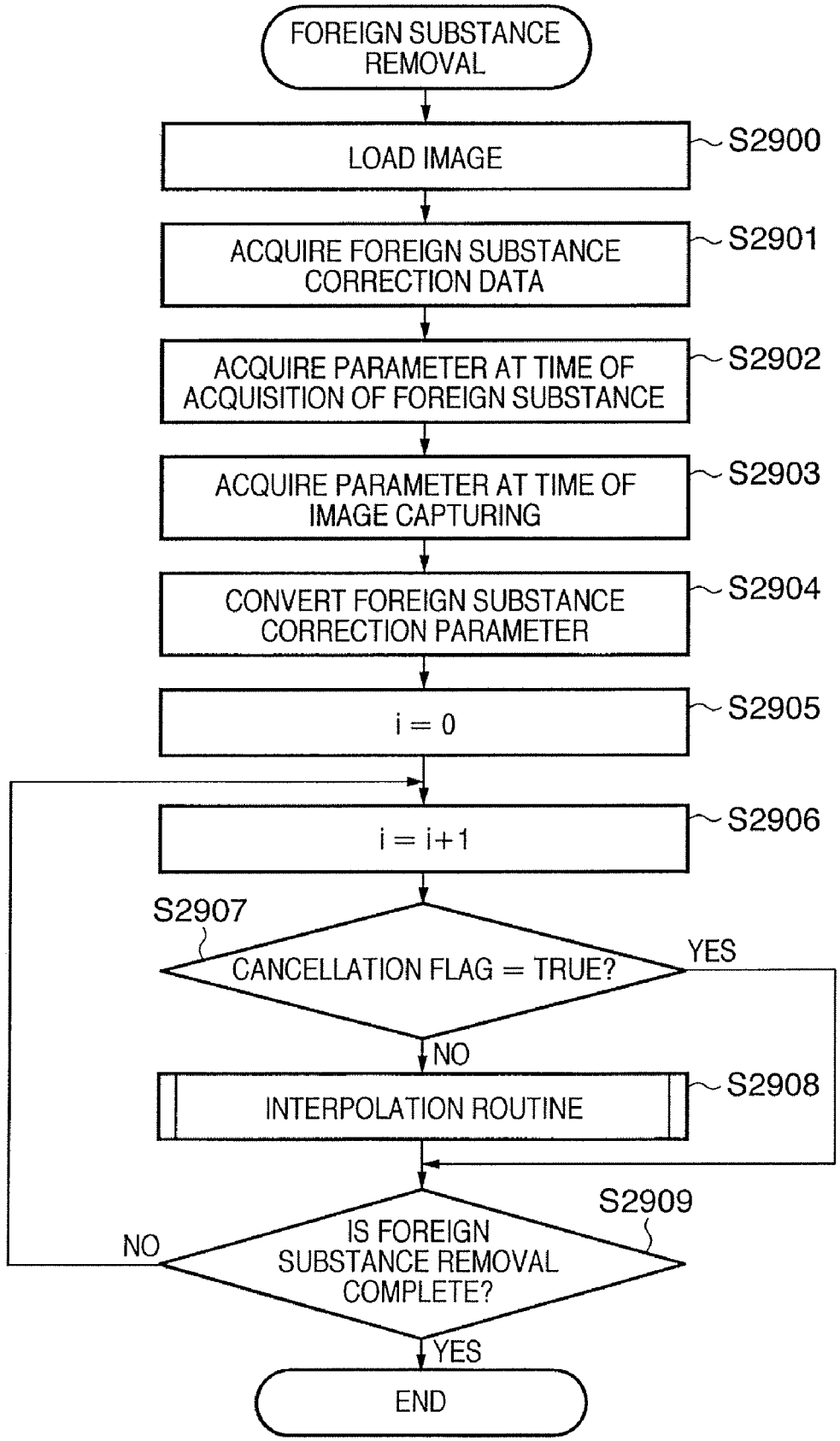
FIG. 30 is a flowchart showing an automatic repair process procedure in a case wherein a cancellation flag is added.

FIG. 30 is a flowchart for an automatic repair process in this embodiment. This process differs from that shown in FIG. 14 in that it checks the cancellation flag in step S2907 before the execution of the interpolation routine. If the cancellation flag is TRUE, interpolation processing (step S2908) is skipped.

Figure 31:
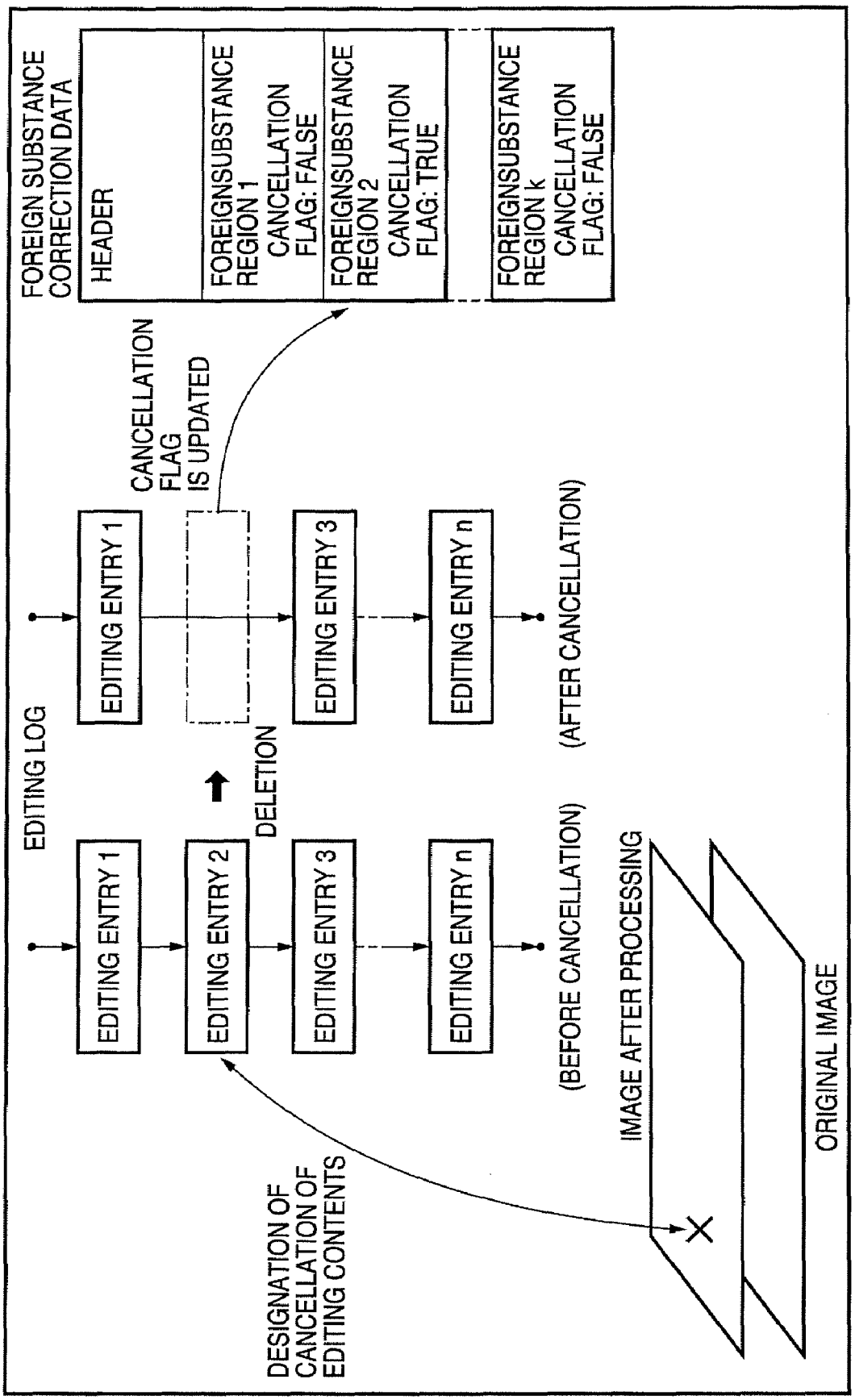
FIG. 31 is a view for explaining the details of update processing for the cancellation flag.

FIG. 31 is a view for explaining processing upon cancellation of editing processing in this embodiment.

When the cancellation of editing contents is designated, a corresponding entry is deleted from an editing log. In addition, if a foreign substance corresponding to the deleted editing log information exists in foreign substance correction data, the cancellation flag in the corresponding foreign substance region is set to TRUE. An editing entry based on GUI operation may have been added to an editing log in addition to an editing entry based on an automatic repair process. Discrimination between them is performed by using a separately prepared correspondence table (not shown) of editing entries and foreign substance region information in foreign substance correction data. Alternatively, holding the serial numbers of foreign substance regions within editing entries makes it possible to specify foreign substance region information corresponding to each editing entry. In this case, designating "−1" instead of a serial number for an editing entry designated by using the GUI allows identification of the absence of corresponding foreign substance information.

Other Embodiments

The objects of the respective embodiments can also be achieved by the following method. A storage medium (or a recording medium) storing software program codes for implementing the functions of the above embodiments is supplied to a system or apparatus. The computer (or a CPU or MPU) of the system or apparatus then reads out and executes the program codes stored in the storage medium. In this case, the program codes read out from the storage medium implement the functions of the above embodiments by themselves, and the storage medium storing the program codes constitutes the present invention. The functions of the above embodiments are implemented not only when the readout program codes are executed by the computer but also when the operating system (OS) running on the computer performs part or all of actual processing based on the instructions of the program codes.

In addition, the functions of the above embodiments are also implemented when the program codes read out from the storage medium are written in the memory of a function expansion board inserted into the computer or a function expansion unit connected to the computer, and the CPU of the function expansion board or function expansion unit performs part or all of actual processing based on the instructions of the program codes.

When the present invention is applied to the above storage medium, the storage medium stores program codes corresponding to the procedures described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-203739, filed on Jul. 26, 2006, which is hereby incorporated by reference herein in its entirety.

What is claimed is:

1. An image processing apparatus which corrects input image data on the basis of the image data and foreign substance information including information associated with a position and a size of a foreign substance adhering near an image sensor in an image capturing apparatus which has captured the image data, comprising:

a correction unit adapted to correct the image data on the basis of the image data and the foreign substance information so as to reduce an influence of a shadow of the foreign substance reflected in the image data;

a determination unit adapted to determine whether an aperture value set when the image capturing apparatus has captured the image data satisfies a predetermined condition; and a control unit adapted to inhibit said correction unit from correcting the image data when said determination unit determines that the aperture value satisfies the predetermined condition.

2. The apparatus according to claim 1, wherein the predetermined condition is that the aperture value is smaller than a predetermined value.

3. The apparatus according to claim 2, wherein the predetermined value is determined on the basis of a relationship with the size of the foreign substance.

4. A method of controlling an image processing apparatus which corrects input image data on the basis of the image data and foreign substance information including information associated with a position and a size of a foreign substance adhering near an image sensor in an image capturing apparatus which has captured the image data, comprising the steps of:

correcting the image data on the basis of the image data and the foreign substance information so as to reduce an influence of a shadow of the foreign substance reflected in the image data;

determining whether an aperture value set when the image capturing apparatus has captured the image data satisfies a predetermined condition; and inhibiting correction of the image data in the correcting step when it is determined in the determining step that the aperture value satisfies the predetermined condition.

5. A program, stored in a storage medium, for controlling an image processing apparatus which corrects input image data on the basis of the image data and foreign substance information including information associated with a position and a size of a foreign substance adhering near an image sensor in an image capturing apparatus which has captured the image data, causing a computer to execute the steps of:

correcting the image data on the basis of the image data and the foreign substance information so as to reduce an influence of a shadow of the foreign substance reflected in the image data;

determining whether an aperture value set when the image capturing apparatus has captured the image data satisfies a predetermined condition; and inhibiting correction of the image data in the correcting step when it is determined in the determining step that the aperture value satisfies the predetermined condition.

* * * * *